United States Patent
Kumaran et al.

(10) Patent No.: US 6,768,744 B1
(45) Date of Patent: Jul. 27, 2004

(54) METHODS AND APPARATUS FOR MANAGING COMMUNICATION NETWORKS SUPPORTING MULTIPLE QUALITY OF SERVICE CLASSES UTILIZING GENERALIZED PROCESSOR SHARING

(75) Inventors: Krishnan Kumaran, Scotch Plains, NJ (US); Geoffrey Edmund Margrave, Naperville, IL (US); Debasis Mitra, Summit, NJ (US); Keith R. Stanley, Warrenville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/531,244

(22) Filed: Mar. 21, 2000

(51) Int. Cl.[7] .............................................. H04L 12/28
(52) U.S. Cl. ....................... 370/412; 370/412; 370/443
(58) Field of Search ................................. 370/229, 230, 370/230.1, 231, 235, 235.1, 412, 414, 417, 418, 468, 395.2, 395.21, 395.4, 395.41, 395.42, 395.43, 905, 443

(56) References Cited

U.S. PATENT DOCUMENTS 6,567,415 B1 * 5/2003 Elwalid et al. ............. 370/412

* cited by examiner

*Primary Examiner*—Douglas Olms
*Assistant Examiner*—Robert W. Wilson

(57) ABSTRACT

Generalized Processor Sharing (GPS) is a scheduling discipline which provides minimum service guarantees as well as fair resource sharing. The performance of GPS is governed by the scheduling weights associated with individual connections. The system discloses methods for GPS scheduling that handle an arbitrary number of connection classes and reservation-based weights and admission control techniques to achieve fairness among connection classes. The methods allow statistical multiplexing gains in the presence of multiple traffic and Quality of Service (QoS) classes of connections that share a common trunk. Also disclosed are several novel techniques to compute and adapt the weights.

43 Claims, 14 Drawing Sheets

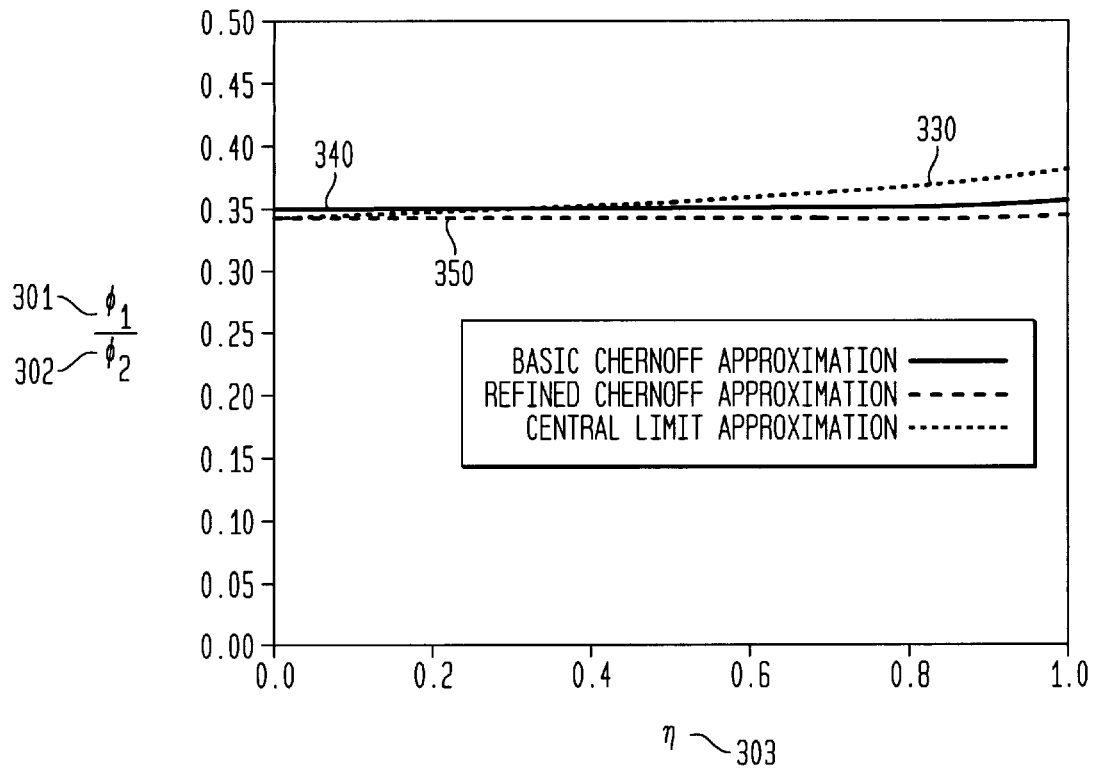
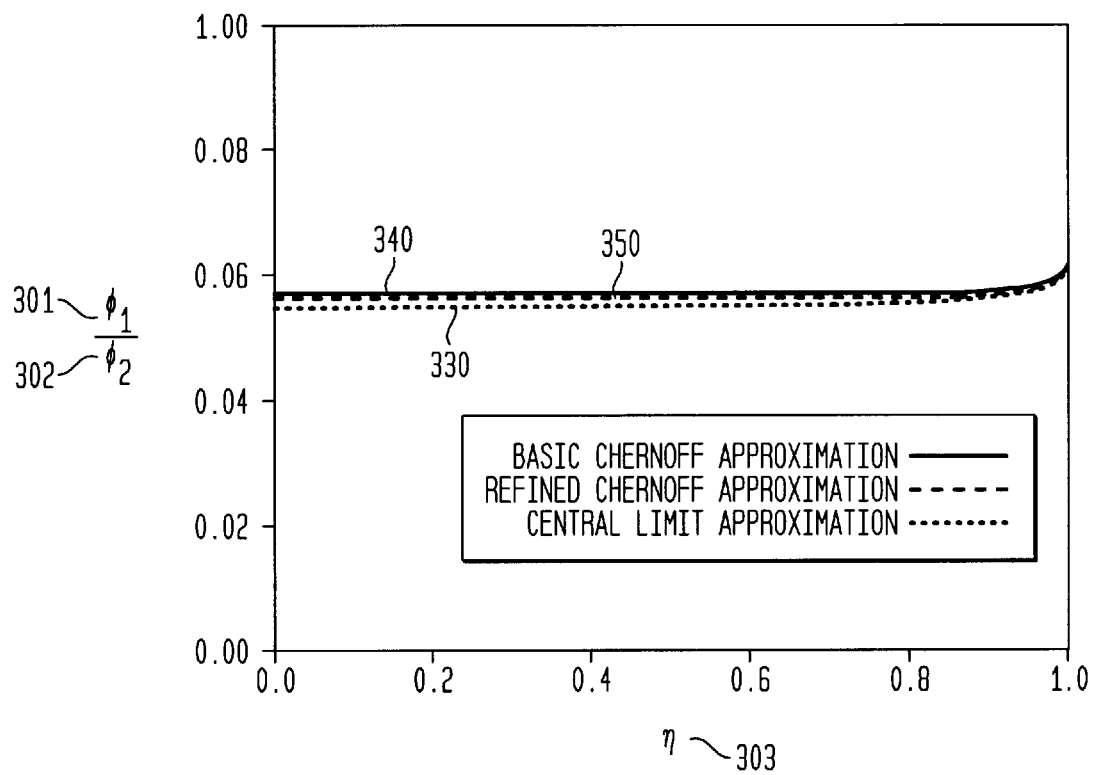

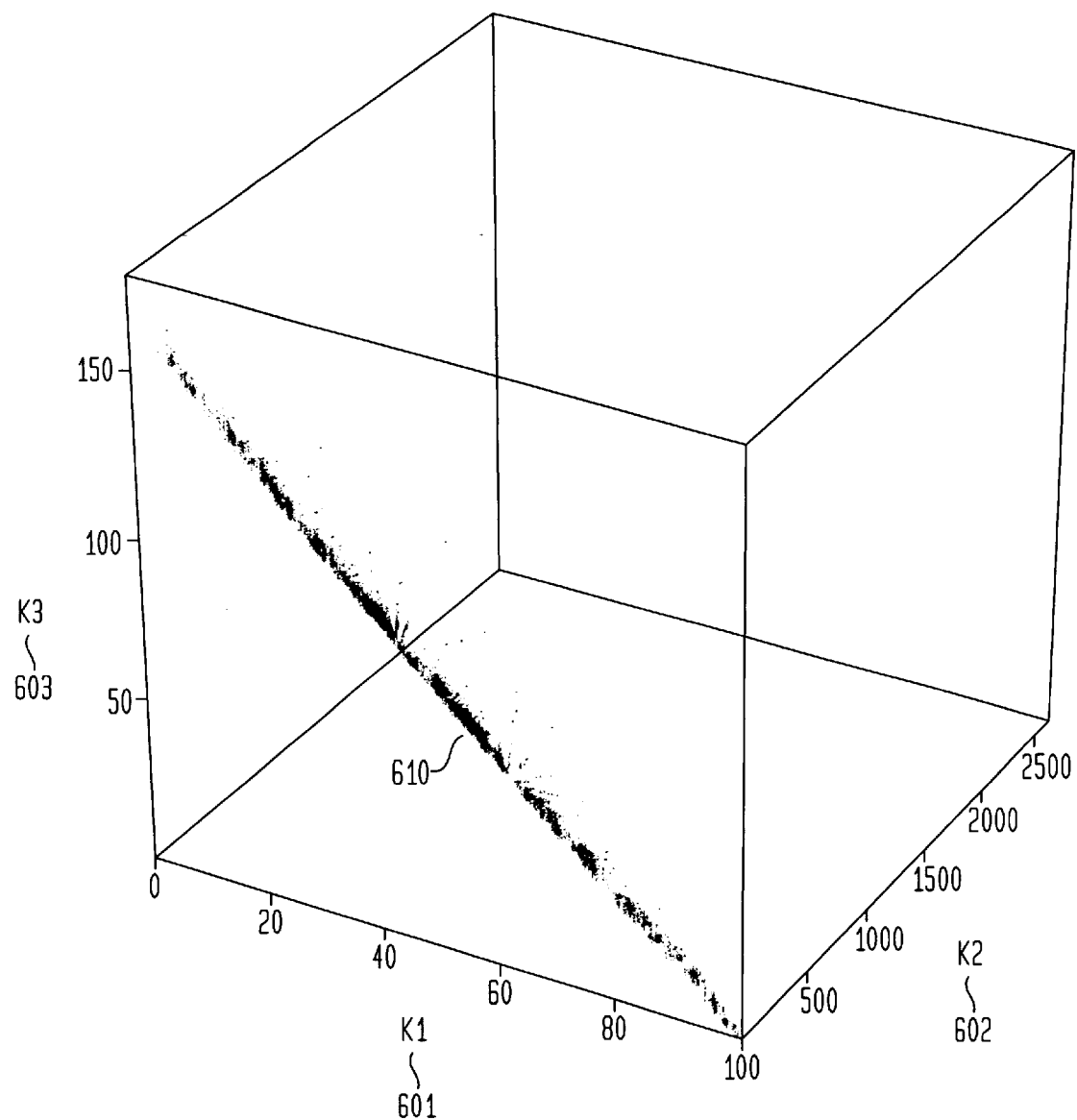

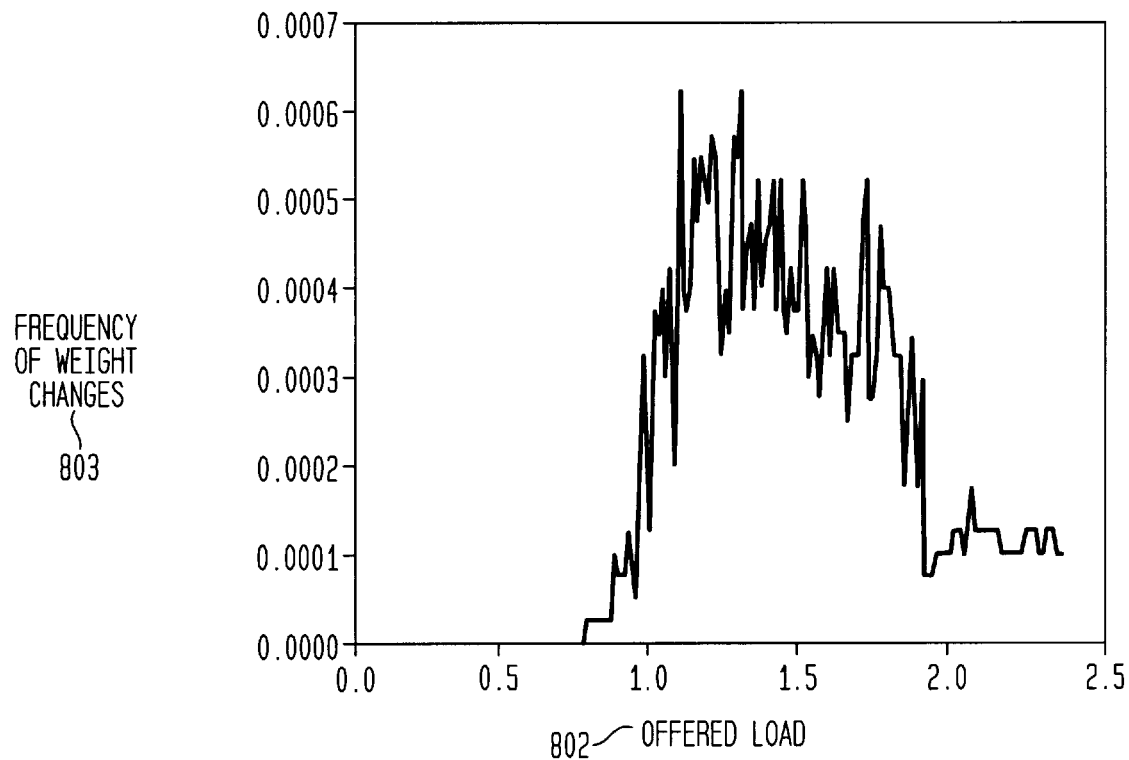
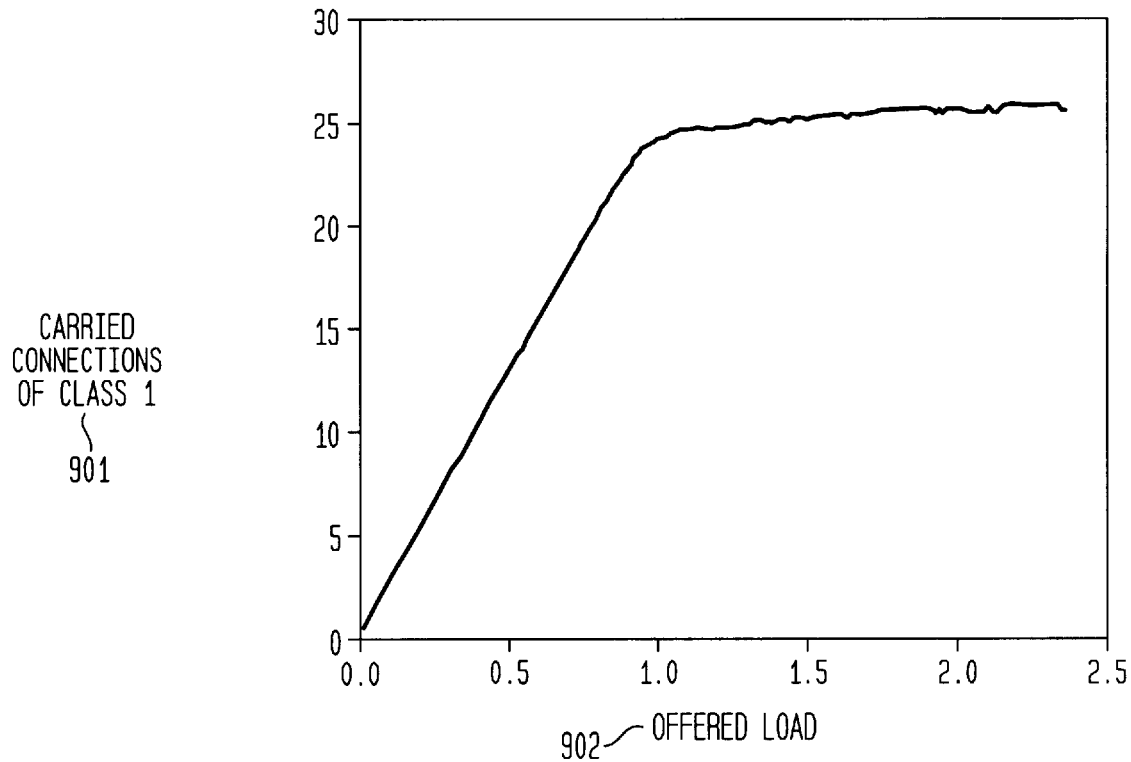

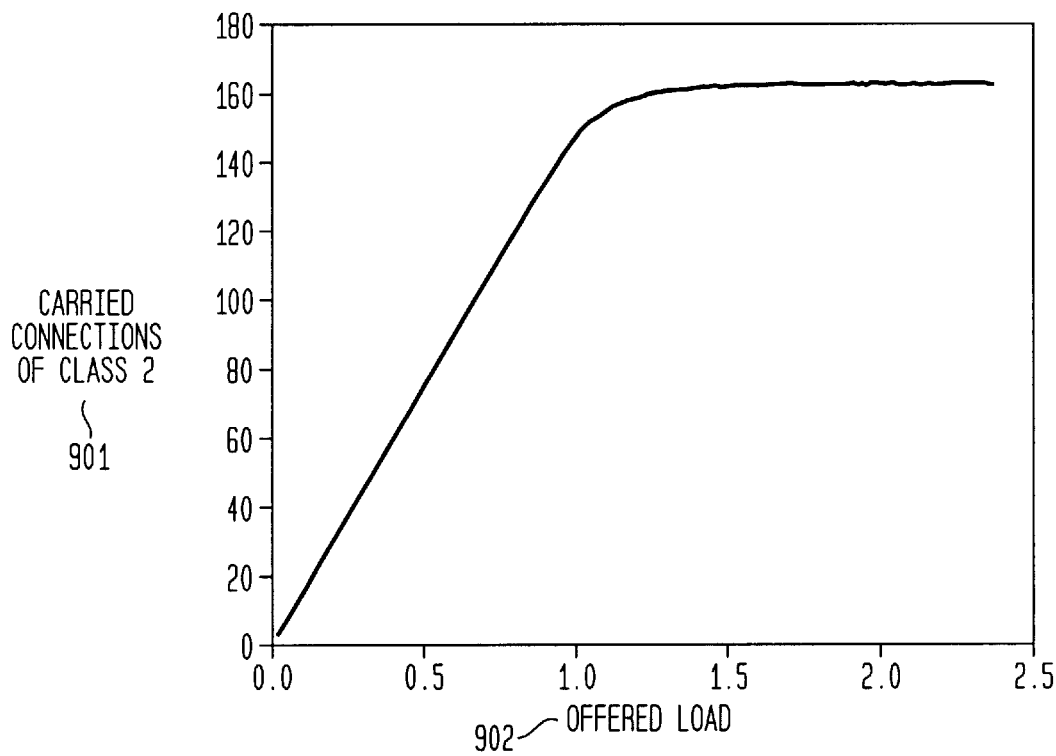
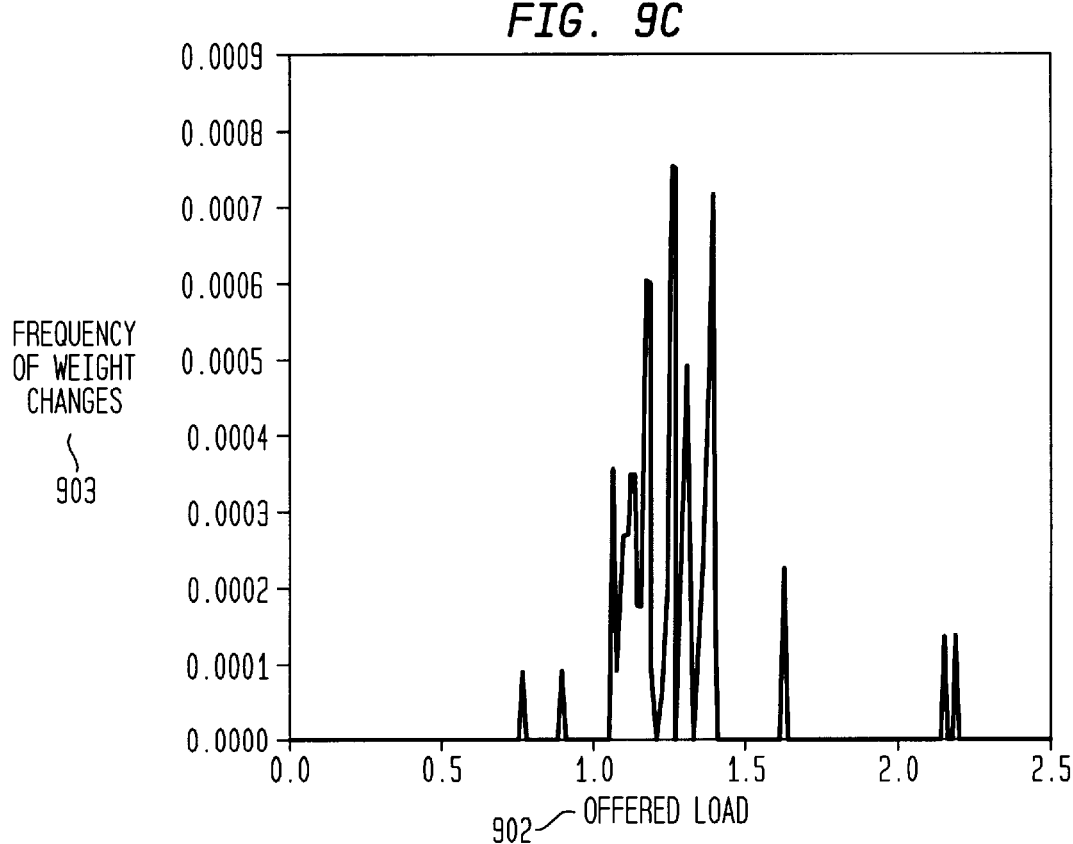

METHODS AND APPARATUS FOR MANAGING COMMUNICATION NETWORKS SUPPORTING MULTIPLE QUALITY OF SERVICE CLASSES UTILIZING GENERALIZED PROCESSOR SHARING

FIELD OF THE INVENTION

The present invention relates generally to improved methods and apparatus for regulating traffic in a communication network. In particular, the invention relates to the advantageous management of communication networks supporting multiple quality of service (QoS) classes utilizing generalized processor sharing (GPS) schedulers. In the present invention, GPS schedulers employing statistical methods allow efficient multiplexing of heterogeneous QoS classes.

BACKGROUND OF THE INVENTION

A simple communication network is comprised of nodes and endpoints, and links that connect individual nodes to other nodes and endpoints. Endpoints may be voice, data, text or video devices such as telephone sets, computers, fax machines, and the like. Individual links transmit voice, data, text, and video signals from endpoints to nodes, and between various nodes within a given communication network. Typically, each link is bi-directional, capable of carrying signals in a forward and reverse direction. Each link is characterized by certain bandwidth parameters that are a measure of a given link's capacity in each direction. Nodes typically include buffers, thereby enabling temporary storage of network traffic at that node. If a given link has insufficient bandwidth to carry the traffic received by that node at a given time, the buffer may be used to store the received traffic until the link can handle the stored traffic.

The explosive growth of consumer demand for Internet access, as well as other network applications, has resulted in a commensurate demand for additional bandwidth in high speed communication networks. The growth in available bandwidth has led to the development of a wide variety of applications with diverse QoS requirements, such as maximum allowable transmission delay and loss of information content, as well as bandwidth characteristics. Despite the growth of available capacity, bandwidth resource management still constitutes a challenge to network providers. The challenge is to provide a service level matched to the needs of a diversity of service requirements that network providers are contractually obligated to guarantee. One significant development in bandwidth resource management has been the utilization of large scale per virtual circuit (per VC) queuing in switch design, since it allows tight control over resource allocation and usage for each network connection. In this context, a virtual circuit (VC) is a connection in an asynchronous transfer mode (ATM) network that appears to the initiating and destination endpoints as a direct connection, regardless of the actual physical network path connecting those endpoints.

GPS schedulers allow substantial network capacity sharing, as well as isolation and QoS guarantees, by assigning a weight to individual connections. These weight assignments are chosen to closely correlate to the actual network traffic characteristics and QoS requirements. Higher weight connections are given a larger proportion of the available bandwidth than lower weight connections in order to maintain the QoS requirements of the particular network.

SUMMARY OF THE INVENTION

The present invention relates to advantageous methods and apparatus for bandwidth resource management in the implementation of GPS schedulers. GPS schedulers allow substantial network sharing capacity, as well as isolation and QoS guarantees. These advantageous properties of GPS schedulers are the result of the proper design of the weights assigned to individual network connections. The weights assigned are closely correlated to the characteristics of the actual network traffic as well as the QoS required for each network connection. In one aspect, the methods disclosed by the present invention allow an arbitrary number of QoS classes of service for an arbitrary number of class connections on a common trunk. In one embodiment, a central limit approximation, based on the central limit theorem, is used to model the aggregate activity of the connections. The performance of the GPS scheduler is governed by the scheduling weights associated with the individual connections. The weight selection for any given connection is formulated as a nonlinear set of algebraic equations. In another embodiment, a Chernoff approximation is applied in a similar manner.

The present invention is applicable to worst-case dual leaky bucket regulated (DLBR) connections, in which connections are classified by their leaky bucket parameters. The QoS is specified by the probability of violating the delay bound, where the probability and delay bound are QoS parameters associated with each connection class. Multiplexing gains are obtained by assuming that the regulated sources are independent and noncolluding.

In another aspect, the present invention provides an advantageous technique based on a reservation mechanism for the slow adaptation of weights, which may also be implemented by switching among a small set of precomputed weights. The technique of the present invention enforces fairness among connections with varying resource requirements, which is an important requirement of connection admission control (CAC).

A more complete understanding of the present invention, as well as further features and advantages, will be apparent from the following Detailed Description and the accompanying drawings.

BRIEF DESCRIPTION OF THE DRAWINGS

FIGS. 3A, 3B and 3C illustrate the ratio of weights $\phi_1/\phi_2$ as a function of traffic mix $\eta$ obtained utilizing the central limit method and the Chernoff bound method in accordance with the present invention;

FIG. 6 illustrates the realizable region for a number of connections of classes K1, K2 and K3;

FIGS. 8A, 8B and 8C illustrate various measurements of efficiency of a necessity based connection admission control method in accordance with one embodiment of the present invention;

FIGS. 9A, 9B and 9C illustrate various measurements of efficiency of a virtual partitioning based connection admission control method in accordance with one embodiment of the present invention;

DETAILED DESCRIPTION

The present invention deals with the characteristics of the capacity region of a multi-class GPS scheduler, and discloses methods for controlling, in real time, the GPS weights that maximize network bandwidth capacity. That is, the GPS scheduler of the present invention maximizes the capacity of an output link by utilizing advantageous methods to assign GPS weights to different classes of connections in real time. These advantageous methods are described in further detail below. Of particular importance are two approaches for controlling GPS weights which are based on the central limit and large deviation regimes. These large deviation regimes logically give rise to the Gaussian and the Chernoff asymptotic approximations. The central limit approximation is applicable when the violation probabilities are relatively high, typically $10^{-6}$ and higher, whereas the latter is better suited to the case where the violation probabilities are small, typically less than $10^{-6}$. While it is typical for ATM systems to be designed for low violation probabilities, the practical experience of the Internet has shown that many applications may be adequately served under less stringent requirements.

Figure 1A:
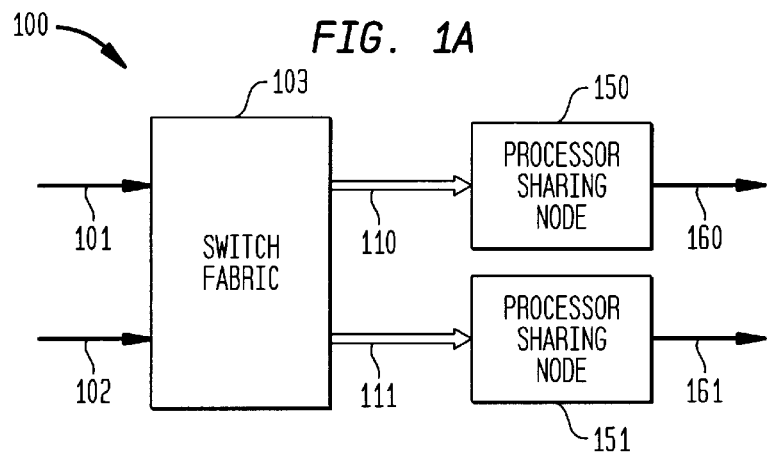
FIG. 1A illustrates an output-buffer switch utilizing a GPS scheduler.

FIG. 1A illustrates a 2×2 output-buffer switch 100 suitable for use in conjunction with the present invention. The 2×2 output-buffer switch 100 is so named as it has two input links 101 and 102 as well as two output links 160 and 161. Input links 101 and 102 carry incoming voice and data signals and are connected to switch fabric 103. Switch fabric 103 contains a processor that separates different classes of connection, as well as performing other switching functions. Switch fabric 103 then routes those signals to one of the processor sharing nodes 150 or 151 along intermediate input connection 110 or 111 respectively. Processor sharing nodes 150 and 151 are functionally equivalent, and the description of one such node follows below in connection with the discussion of FIG. 1B.

Figure 1B:
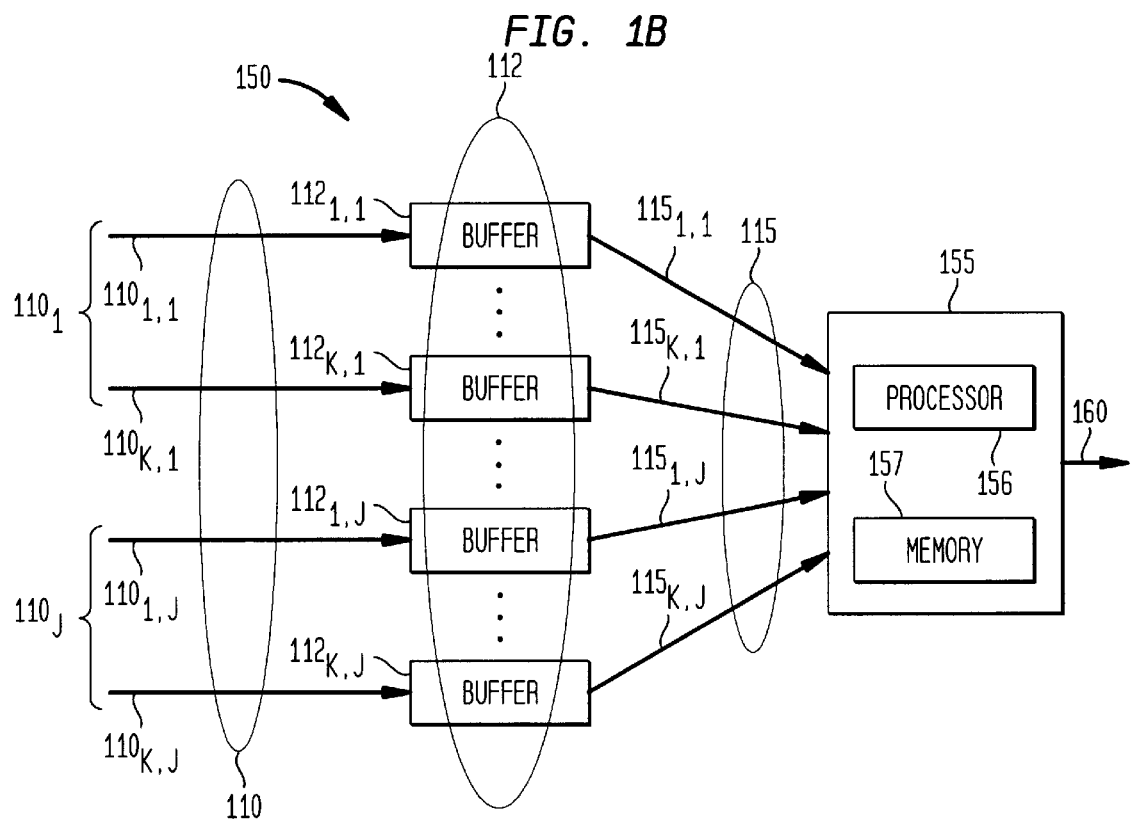
FIG. 1B illustrates a multi-class GPS scheduler at a node in accordance with the present invention.

The details of a system 150 in accordance with the present invention are shown in FIG. 1B. The traffic of each intermediate input connection 110 is dual leaky bucket regulated prior to its arrival at its GPS input node 115. Each connection 110 is buffered by a connection buffer 112, the output of which is subject to peak rate regulation. FIG. 1B illustrates an arbitrary number of QoS classes of connections $110_1$ through $110_J$. Each class of connections may contain a varying number of connections 1 through K. For example, FIG. 1B illustrates connections $110_{1,1}$ through $110_{K,1}$ for connection class $110_1$. As illustrated in FIG. 1B, connection $110_{1,1}$ is the $1^{st}$ connection of the $1^{st}$ connection class, connection $110_{K,1}$ is the $K^{th}$ connection of the $1^{st}$ connection class, $110_{1,J}$ is the $1^{st}$ connection of the $J^{th}$ connection class, and $110_{K,J}$ is the $K^{th}$ connection of the $J^{th}$ connection class. Each connection 110 is dual leaky bucket regulated by buffer 112 and fed to GPS scheduler 155 on input 115. The GPS scheduler 155 is comprised primarily of a programmable processor 156 which has been suitably programmed as discussed further below, and a memory 157. Memory 157 may be utilized to store initial state weights for each class of connections 110 and to store programs to be utilized by processor 156. Memory 157 may be further utilized to store updated weights for each class of connection. These updated weights are determined by measuring the fraction of output bandwidth, or traffic mix, used by each class of connection, and then applying the advantageous methods described below to the observed traffic mix. The scheduling function of GPS scheduler 155 may be implemented by programming the processor 156, although the necessary computations may be performed anywhere within the switch fabric, within a router, or the like. The output connection of GPS scheduler 155, output link 160, carries the multiplexed input connection signals of the different connection classes, according to the weighting methods described further below.

A typical dual leaky bucket regulator has parameters (r, P, $B_T$), where r is the token rate, P is the constraint on the peak rate and $B_T$ is the token buffer size. The parameters of the regulator for each class of connection are characteristic of the class. The QoS specifications for each connection of class j, $1 \leq j \leq J$, are the delay bound $D_j$, and the loss probability $L_j$, which bounds the probability of violation of the delay bound. Therefore, each class is specified by a five-tuple (r, P, $B_T$, D, L).

The advantages of the disclosed methods of GPS scheduling are shown in the following experimental results and illustrated in FIGS. 2A, 2B and 2C, FIGS. 3A, 3B and 3C, FIGS. 4A, 4B and 4C, FIGS. 5A, 5B and 5C, and FIG. 6. The experimental results illustrated are for the realizable regions obtained by adapting the central limit and Chernoff approaches adopted in accordance with the present invention, and as discussed further below. Also, further experimental results are described that illustrate the simulated real time behavior of the weight adaptation and connection admission control (CAC) methods which are described below. Experimental numerical results of the realizable region for simple, diverse examples with two and three connection classes are shown. The examples use different combinations of source classes with characteristics as described in Table 1 below. The following examples are considered:

Example 1: Source connection classes 1 & 2.
Example 2: Source connection classes 3 & 4.
Example 3: Source connection classes 5 & 6.
Example 4: Source connection classes 4, 5 & 6.

Note that the source characteristics of the 6 classes as shown in Table 1 correspond to voice for class 5, while the remaining classes represent various classes of data.

TABLE 1

| Source Class | e | a = r/e | $L_k$ |
|---|---|---|---|
| 1 | 1.48 | 0.1 | $10^{-3}$ |
| 2 | 0.158 | 0.95 | $10^{-9}$ |
| 3 | 0.62 | 0.24 | $10^{-3}$ |
| 4 | 1.31 | 0.11 | $10^{-9}$ |
| 5 (Voice) | 0.0318 | 0.5 | $10^{-3}$ |
| 6 | 0.48 | 0.31 | $10^{-9}$ |

For each of the four examples listed above, the realizable region for each of the following cases are plotted:

Case 1: No statistical multiplexing, i.e. $\Sigma_j K_j e_o^j \leq C$.

Case 2: The mean value approximation, i.e. $\Sigma_j K_j a_j e_o^j \leq C$.

Case 3: The central limit approximation.

Case 4: The basic Chernoff approximation.

Case 5: The refined Chernoff approximation.

Figure 2A:
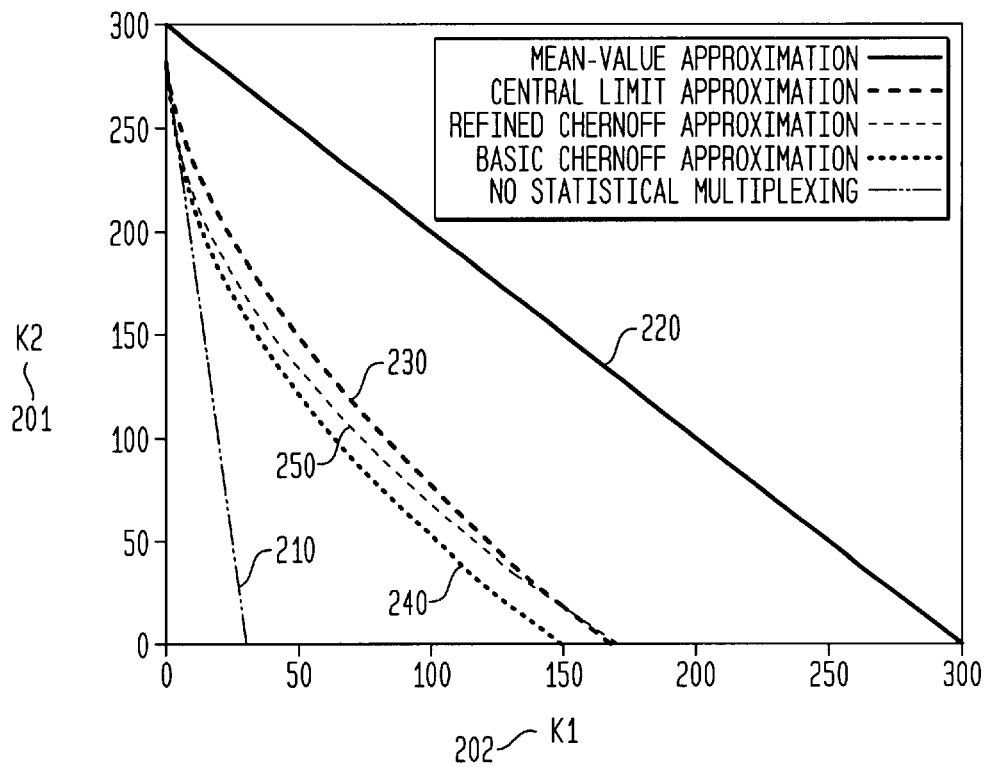
FIGS. 2A, 2B and 2C illustrate the realizable region for a number of connections of classes K1 and K2 obtained utilizing a central limit approximation and a Chernoff approximation in accordance with the present invention.
Figure 2B:
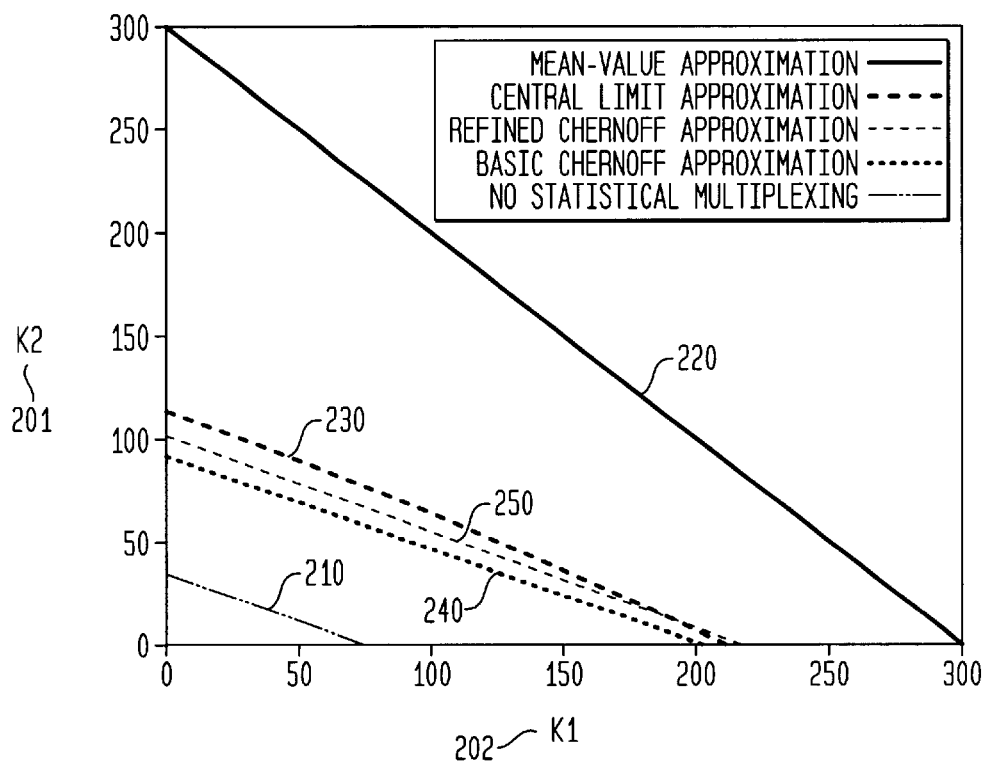
Figure 2C:
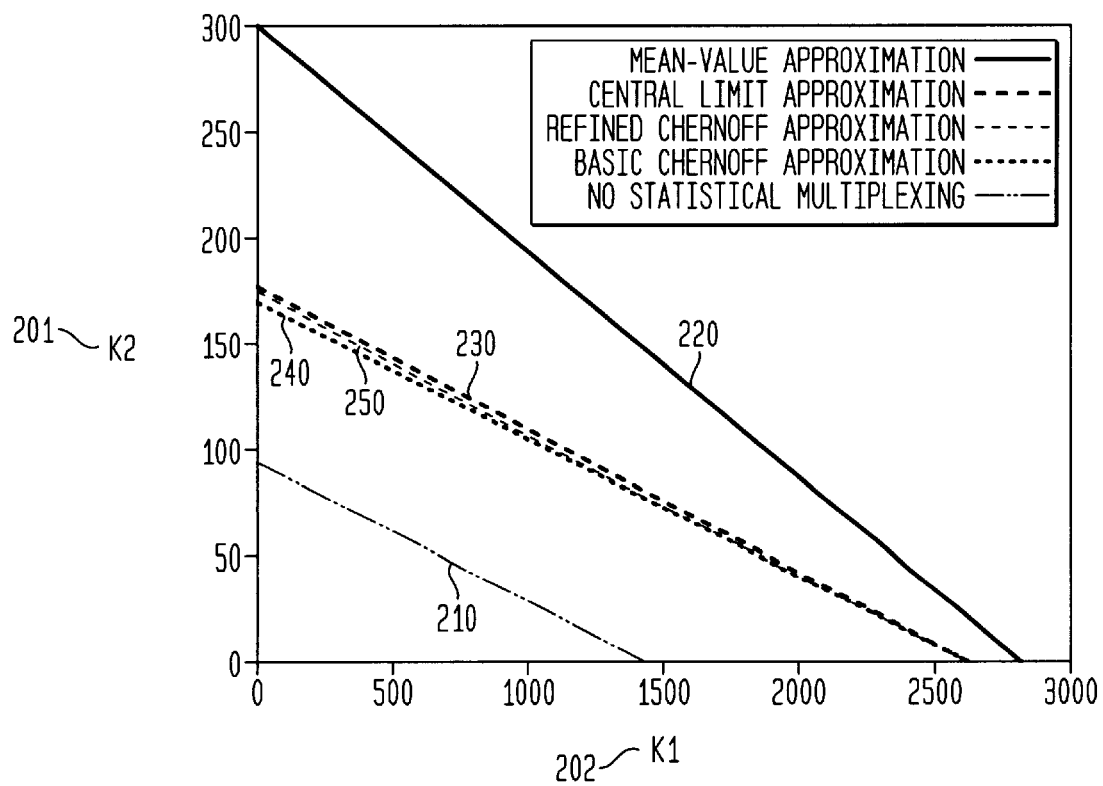

For examples 1, 2 and 3 above, the following data are plotted. FIGS. 2A–2C illustrate the realizable region for a varying number of connections of two connection classes, K1 201 and K2 202. FIGS. 2A, 2B and 2C show the realizable region plotted for the five above cases for examples 1, 2 and 3 respectively. It can be seen that the realizable regions obtained utilizing the central limit approximation 230 and the basic Chernoff approximation 240 are very similar, and that the realizable region utilizing the refined Chernoff approximation 250 is between the two. It can also be seen that the mean value approximation 220 is too optimistic. In other words, the realizable region is much larger than the other approximations. The realizable region found when no statistical multiplexing 210 is utilized is quite small, and therefore emphasizes the capacity gains that statistical multiplexing provide.

Figure 3A:
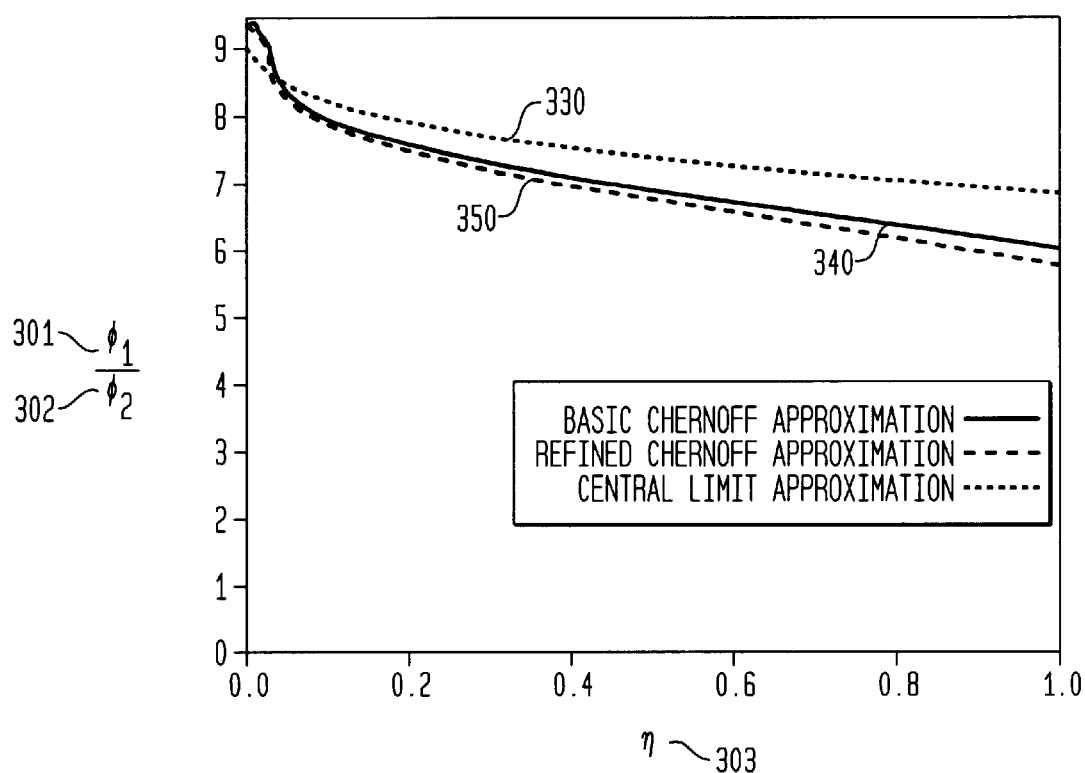

FIGS. 3A–3C illustrate the ratio of weights $\phi_1/\phi_2$ versus the traffic mix η 303 for the central limit and Chernoff bound methods, where the weights $\phi_1$ 301 and $\phi_2$ 302 correspond to connection classes K1 201 and K2 202 respectively. FIGS. 3A, 3B and 3C illustrate the ratio of weights $\phi_1/\phi_2$ for the five above cases for examples 1, 2 and 3 respectively. It can be seen that the ratios obtained utilizing the central limit approximation 330, the basic Chernoff approximation 340 and the refined Chernoff approximation 350 are also very similar.

Figure 4A:
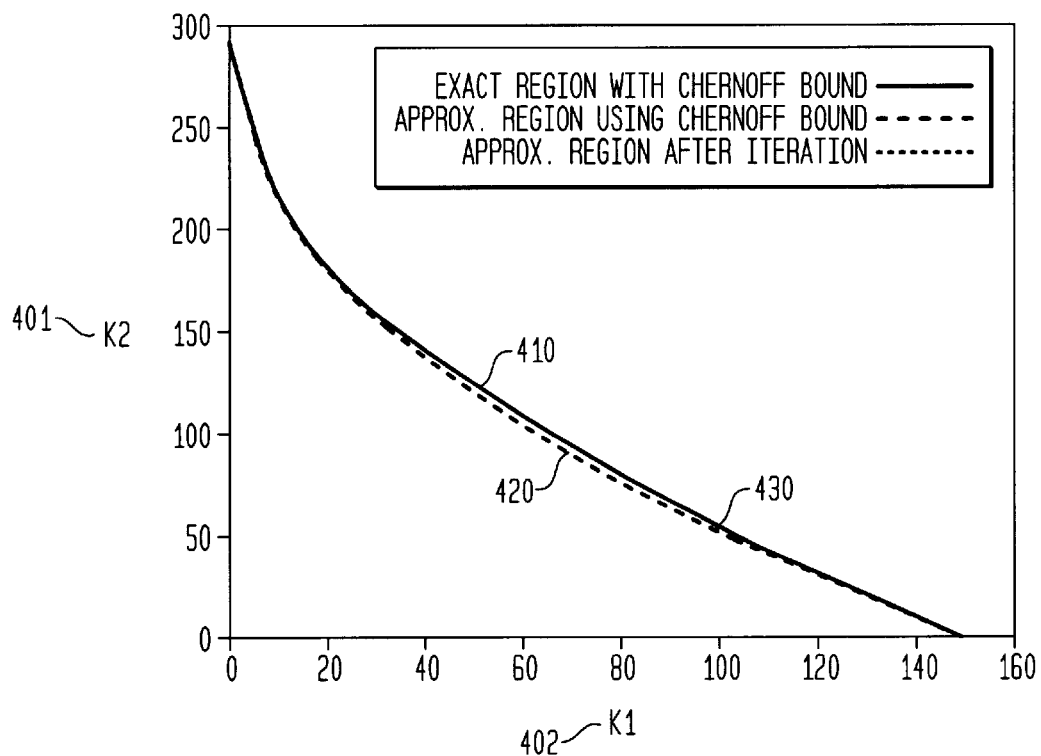
FIGS. 4A, 4B and 4C illustrate the exact and approximate realizable regions for a number of connections of classes K1 and K2 obtained utilizing the Chernoff bound method in accordance with the present invention.
Figure 4B:
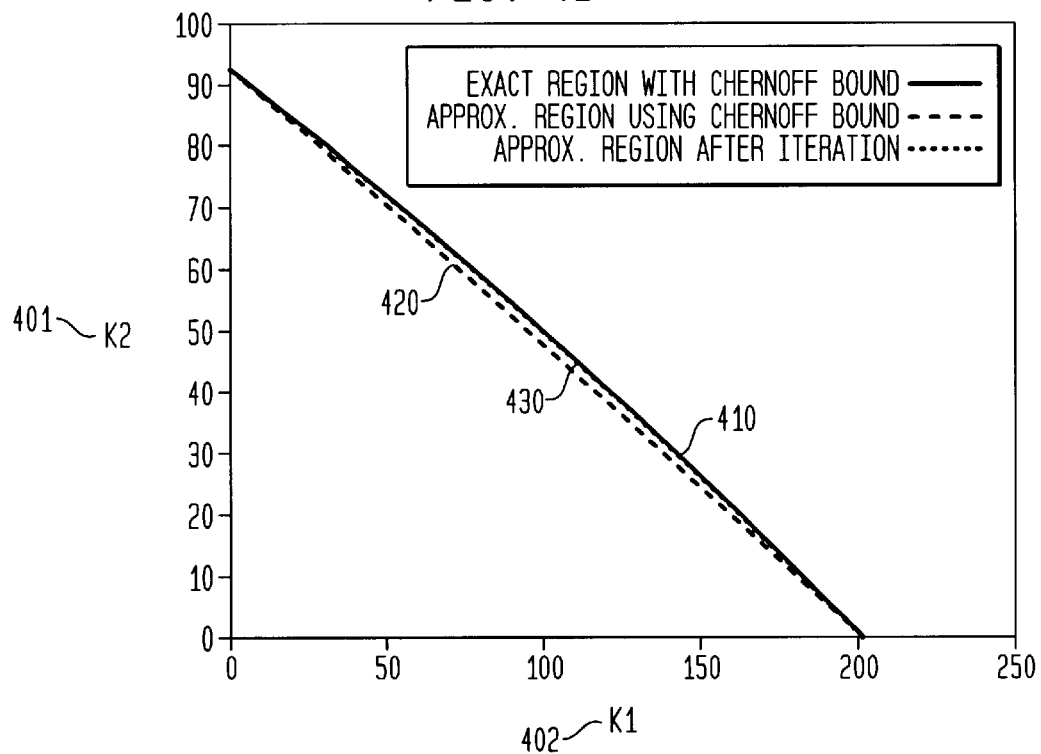
Figure 4C:
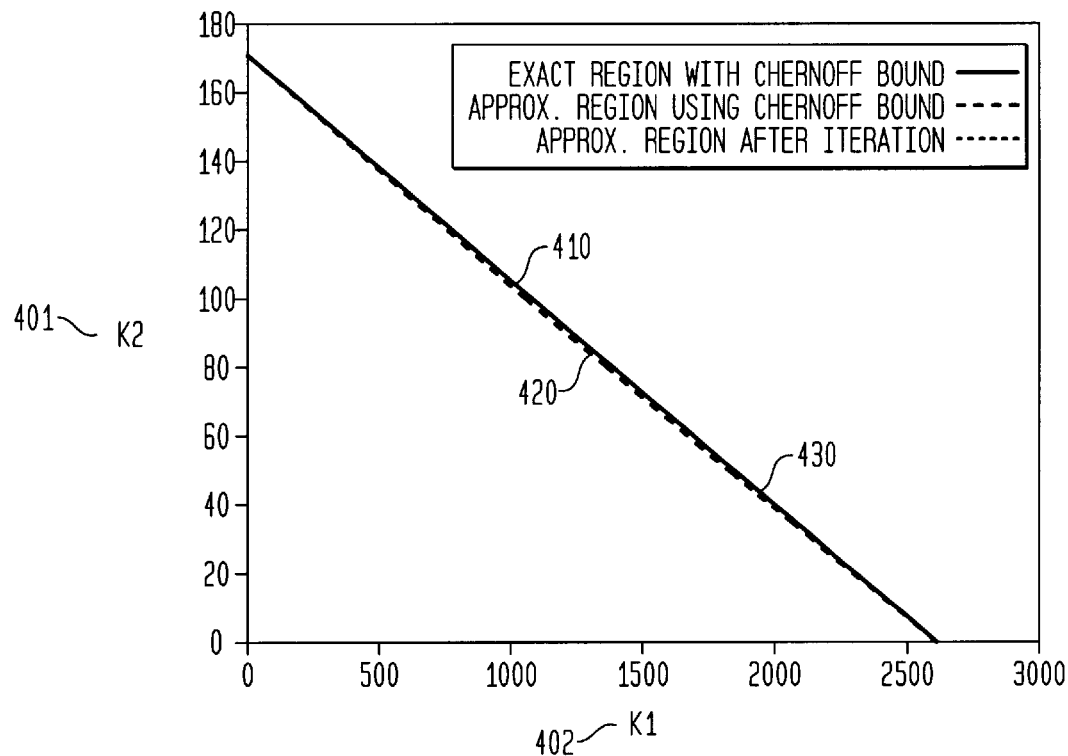
Figure 5A:
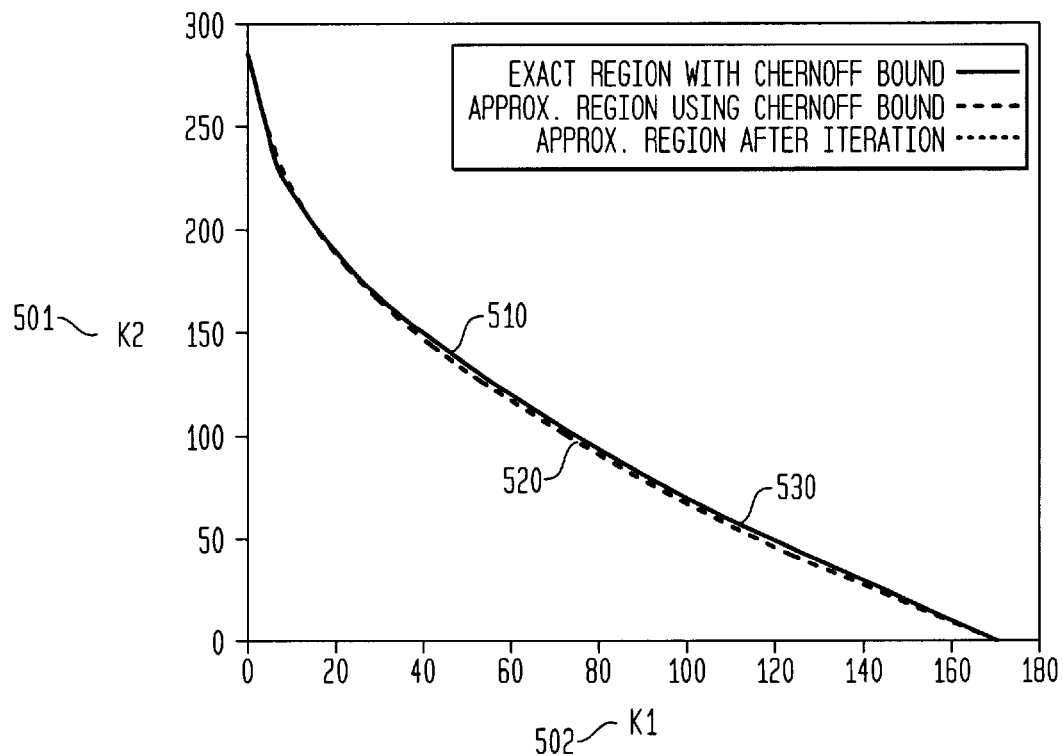
FIGS. 5A, 5B and 5C illustrate the exact and approximate realizable regions for regions for a number of connections of classes K1 and K2 obtained utilizing the refined Chernoff approximation in accordance with the present invention.
Figure 5B:
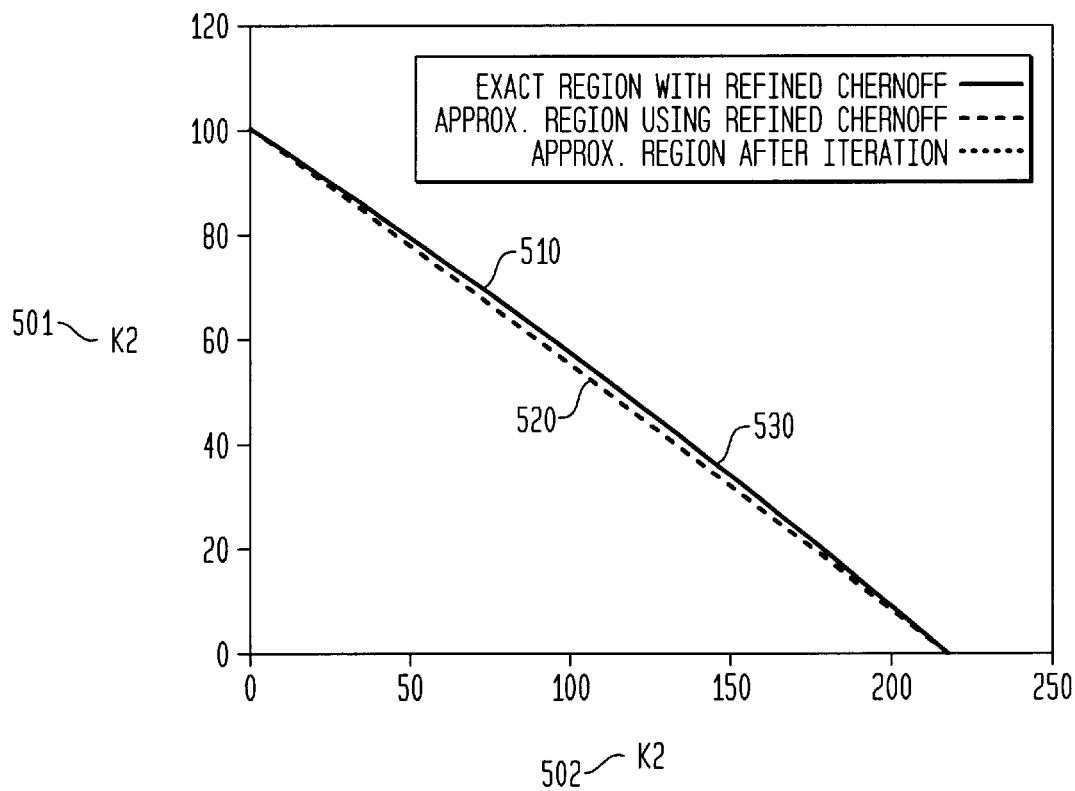
Figure 5C:
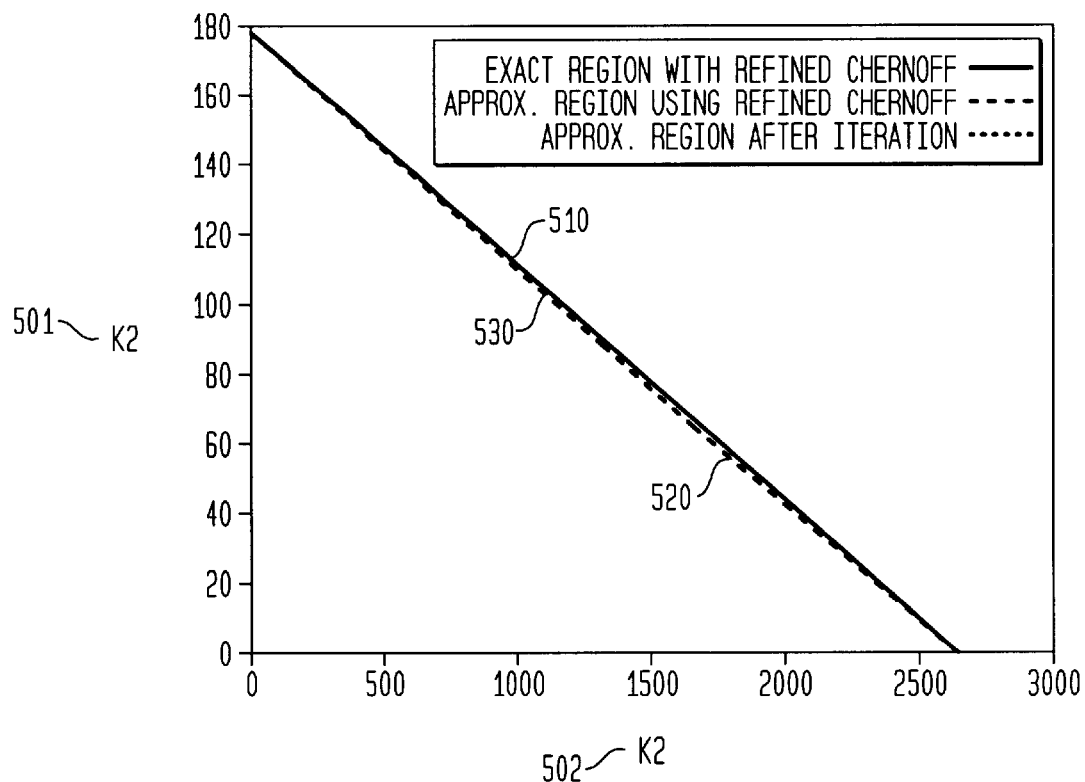

For comparison, FIGS. 4A–4C illustrate the exact realizable region 410 and the approximate realizable region 420 for a varying number of connections of two connection classes, K1 401 and K2 402, utilizing the adapted Chernoff approximation method, as discussed below. FIGS. 4A–4C also illustrate the iterative approximate realizable region 430. FIGS. 4A, 4B and 4C show the realizable region plotted for the five above cases for examples 1, 2 and 3. FIGS. 5A–5C further illustrate results that are similar to those shown in FIG. 4A–4C, but obtained using the adapted refined Chernoff approximation method, as discussed below. FIGS. 5A–5C illustrate the exact realizable region 510 and the approximate realizable region 520 for a varying number of connections of two connection classes, K1 501 and K2 502. FIGS. 5A, 5B and 5C show the realizable region plotted for the five above cases for examples 1, 2 and 3. Notice that the approximate realizable, region 520 differs only slightly from the exact realizable region 510. FIGS. 5A–5C also illustrate the iterative approximate realizable region 530. Note also that the iterative process for determining optimal weights, as described below and shown by FIG. 7, yield realizable regions that are very close to optimal.

FIG. 6 illustrates the 3-connection class example, where only the realizable region 610 is plotted in three dimensions, for a varying number of connections of connection classes K1 601, K2 602 and K3 603. The realizable region has a boundary that is roughly linear, in this example a diagonal plane through the cube.

Figure 8A:
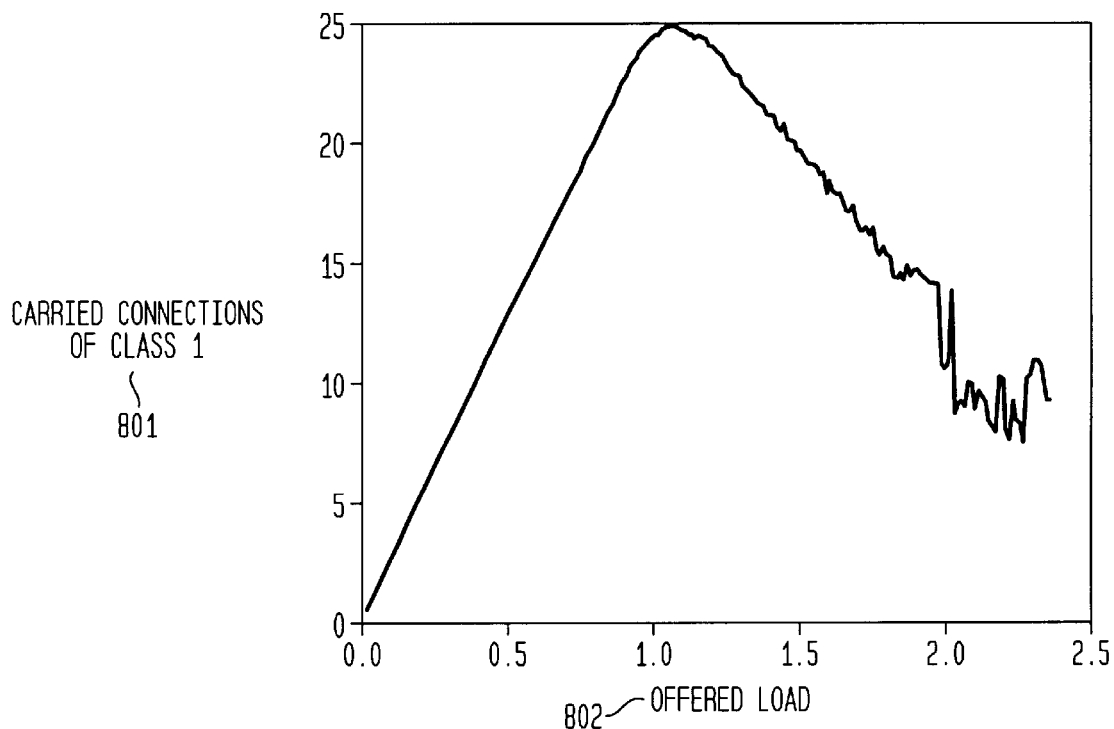
Figure 8B:
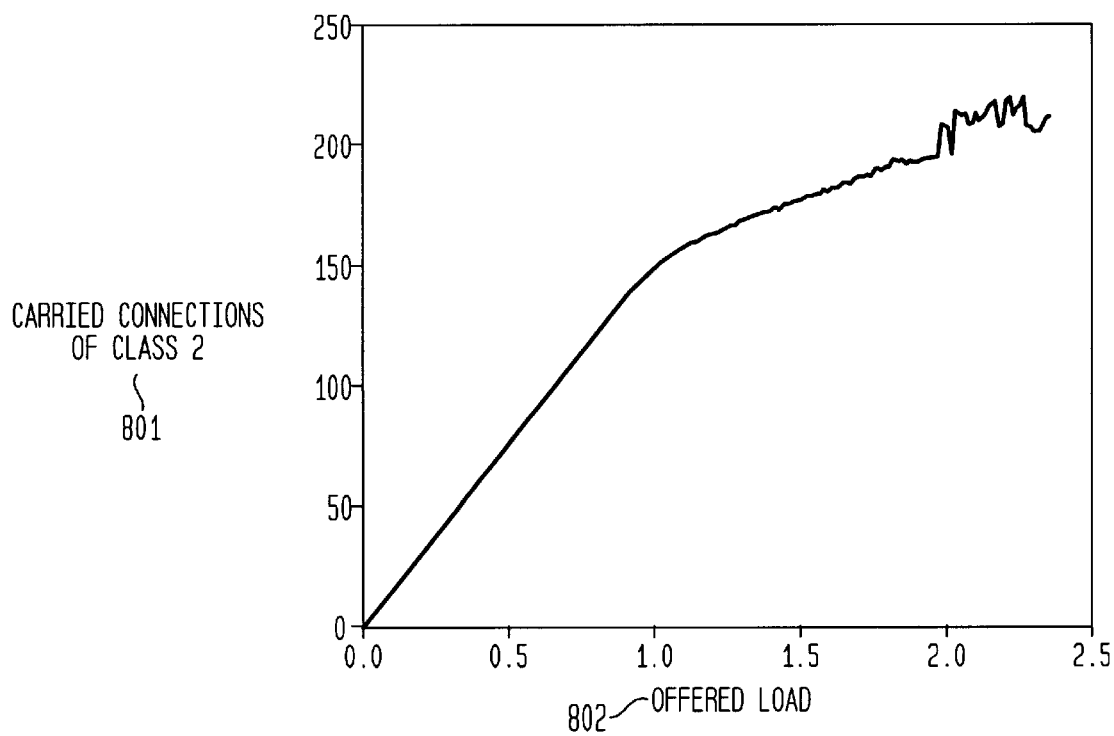

Simulation results for the real time connection admission control methods N-CAC and VP-CAC, as discussed below, are illustrated by FIGS. 8A–8C and FIGS. 9A–9C, respectively. The simulations were run for 2 different QoS classes, class 1 and class 2 as shown in Table 1 above, utilizing Poisson connection traffic, that is, Poisson connection arrivals with exponentially distributed holding times. The arrival rates λ1 and λ2 were scaled at a 2:1 ratio, and the holding times $$\frac{1}{\mu_1}, \frac{1}{\mu_2}$$

were fixed at a 3:1 ratio. A nominal load measure:

$$\frac{1}{C} \sum_{k=1}^{2} \frac{\lambda_k}{\mu_k} e_o^k a_k$$

is defined with respect to which all performance measures are plotted. FIGS. 8A–8B illustrate the load factor for class 1 and class 2 connections respectively utilizing the N-CAC method described further below. FIGS. 9A–9B illustrate the load factor for class 1 and class 2 connections respectively, utilizing the VP-CAC method described further below. In each simulation, the number of carried connections of each class was varied as shown. FIG. 8C and FIG. 9C illustrate the associated number of weight changes needed to accomplish the results shown in FIGS. 8A–8B and FIGS. 9A–9B when utilizing the N-CAC and VP-CAC methods in a steady state, respectively.

In the case of the VP-CAC method, the desired traffic mix η* was determined using the ratio of arrivals to departures for each QoS class. For each data point, the simulation was run for a long enough period of time to eliminate the initial transient behavior, after which the data shown were collected.

FIGS. 8A–8B illustrate the carried load 801 versus the offered load 802 for each class. As is readily apparent from the figures, as the offered load 802 was increased, the smaller bandwidth connections dominate the system when utilizing the N-CAC method. FIGS. 9A–9B illustrate the carried load 901 versus the offered load 902 for each class. FIG. 9A–9B shows that with only a single connection of reservation, the VP-CAC method is able to keep the traffic mix stable.

FIG. 8C illustrates the frequency of weight changes 803 needed versus the offered load 802. This plot shows that the frequency of weight changes 803 increase as the traffic increases when utilizing the N-CAC method. FIG. 9C illustrates the frequency of weight changes 903 needed versus the offered load 902. FIG. 9C shows that a substantial number of weight changes are needed at the boundary as the system approaches overload, when utilizing the VP-CAC method. At very high loads, the VP-CAC method drives the system towards the desired traffic mix and the corresponding weights, thus providing greater stability in addition to the added advantage of more fairness for connection admission.

In addition to the above, the simulations provided insight into the transient behavior of the VP-CAC method. In a typical implementation, the choice of the desired traffic mix may be determined by a forecast of the offered the traffic. Periodically, a new desired mix is computed to correspond to expected changes in traffic. As will be apparent from the discussion below, the GPS weights cannot be instantaneously changed to the weights that would properly correspond to the new desired traffic mix. Therefore, the transient behavior of the VP-CAC method in response to changes in the targeted mix is well adapted for use in this environment since the weight changes are quite smooth but rapid, requiring few weight changes.

The discussion now turns to the description of the advantageous methods of GPS scheduling and connection admission control. It has been previously shown that in the extremal regulated connection process, the bandwidth demand to satisfy QoS is an on-off process taking values $e_o$ and 0 for time fractions a and (1-a), respectively. See, for example, A. Elwalid and D. Mitra, "Design of Generalized Processor Sharing Schedulers Which Statistically Multiplex Heterogeneous QoS Classes", Proceedings of IEEE INFOCOM'99, pp. 1220–1230, U.S. patent application Ser. No. 09/273,433 filed on Mar. 20, 1999, and A. Elwalid, D. Mitra and R. H. Wentworth, "A New Approach for Allocating Buffers and Bandwidth to Heterogeneous, Regulated Traffic in an ATM Node", IEEE Journal on Selected Areas in Communications, vol. 13, num. 6, pp.1115–1127, August 1995, all of which are incorporated by reference in their entirety.

In equation (1) below, $e_o$ is the effective bandwidth for lossless multiplexing and is given by:

$$e_o = \max\left\{r, \frac{P}{1 + \frac{D}{B_T}(P-r)}\right\} \tag{1}$$

The activity indicator a is given by $a = r/e_0$.

The weight given to connections of class j in the GPS scheduler 155 of FIG. 1 is denoted by $\phi_j$, where $1 \leq j \leq J$. The output bandwidth C allotted to such a connection at any instant in time by the GPS scheduler 155 is:

$$\frac{\phi_j C}{\sum_l \phi_l \sum_{i=1}^{K_l} \zeta_i^l} \tag{2}$$

where $\zeta_i^j$ is the binary activity indicator variable for connection i in class j.

In considering statistical QoS, the extremal regulated connection processes have independent random phases. An extremal connection is the worst case connection that switches between on and off. As a consequence of this worst case condition, the activity indicators $\zeta_i^j$ are independent, binomial random variables:

$$Pr(\zeta_i^j = 1) = 1 - Pr(\zeta_i^j = 0) = a_j \tag{3}$$

In the next example, consider one specific, or tagged, connection which is active, and assume, without loss of generality, that it is connection 1 of class k. This tagged source will satisfy its QoS requirement if it receives at least bandwidth $e_0^k$, with probability not less than $(1-L_k)$, i.e., from equation (2):

$$Pr\left[\frac{\phi_k C}{\phi_k + \phi_k \sum_{i=2}^{K_k} \zeta_i^k + \sum_{j \neq k} \phi_j \sum_{i=1}^{K_j} \zeta_i^j} \geq e_k^o\right] \geq 1 - L_k. \tag{3.1}$$

Equivalently:

$$L_k \geq Pr\left[\phi_k + \phi_k \sum_{i=2}^{K_k} \zeta_i^k + \sum_{j \neq k} \phi_j \sum_{i=1}^{K_j} \zeta_i^j \geq \phi_k C / e_o^k\right] > \tag{4}$$

-continued $$Pr\left[\sum_{j=1}^{J} \phi_j \sum_{i=1}^{K_j} \zeta_i^j \geq \phi_k C / e_o^k\right].$$

Hence, statistical QoS is satisfied for all extremal regulated connection processes if, for all k ($1 \leq k \leq J$):

$$-\ln Pr\left[\sum_{j=1}^{J} \phi_j \sum_{i=1}^{K_j} \zeta_i^j \geq \phi_k C / e_o^k\right] \geq -\ln L_k \tag{5}$$

Equation (5) gives the conditions to be satisfied for the set of connections given by $K = \{K_j\}$ to meet their QoS requirements when the scheduler weights are $\{\phi_j\}$. Note from equation (2) that scheduling is not affected by any constant of proportionality applied to all the weights.

Of fundamental importance is the realizable set, or region, $\mathfrak{R}$ which is defined as the set of connection population vectors K for which there exists a set of weights $\{\phi_j\}$ such that equation (5) is satisfied. In investigating $\mathfrak{R}$ below, it will be convenient to parameterize K thus:

$$K = K(\eta_1, \eta_2, \ldots, \eta_j), \sum_j \eta_j = 1. \tag{6}$$

The vector $\eta$ denotes the traffic mix and, for given $\eta$, the goal is to find the largest value of K that is realizable.

In one embodiment, the present invention determines the realizable region utilizing the adapted Gaussian approximation. Calculation of the realizable region utilizing the adapted Gaussian approximation method requires a determination of the bounds for characterizing the realizable region. A simple and conservative bound for the realizable region may be obtained by a mean value approximation by assuming all connections are active all the time:

$$\sum_j K_j e_o^j \leq C; \quad \phi_j = \frac{e_o^j}{\sum_{k=1}^{J} e_o^k}(1 \leq j \leq J). \tag{7}$$

At the other extreme, a rough optimistic estimate of the realizable region is obtained by using mean values of the activity indicators, $$\varepsilon\left[\sum_{i=1}^{K_j} \zeta_i^j\right] = K_j a_j. \tag{7.1}$$

Using mean values for the condition invoked in the right hand side of equation (4) gives:

$$\sum_{j=1}^{J} \phi_j K_j a_j \leq \phi_k C / e_o^k (1 \leq j \leq J). \tag{8}$$

The corresponding realizable region is a simplex:

$$\sum_{j=1}^{J} K_j a_j e_o^j \le C \quad (9)$$

with the weights $\phi_j = e_o^j$. This approximation is a somewhat crude and optimistic bound on the realizable region.

In another embodiment, the present invention determines the realizable region utilizing the adapted central limit approximation. In this manner, the adapted central limit theorem for $\{K_j\}$ yields:

$$\sum_{i=1}^{K_j} \xi_i^j \to K_j a_j + \sqrt{K_j a_j (1-a_j)}\, U_j \quad (10)$$

where $U_j = N(0,1)$ is a zero mean, unit variance Gaussian random variable. From equations (10) and (5), for $k=1,\ldots,J$:

$$-\ln Pr\left[\sum_j \phi_j \sqrt{K_j a_j(1-a_j)}\, U > \frac{\phi_k C}{e_o^k} - \sum_j \phi_j K_j a_j\right] \ge -\ln L_k. \quad (11)$$

where $U = N(0,1)$ and satisfies the following equality in distributions:

$$\sum_j \phi_j \sqrt{K_j a_j(1-a_j)}\, U_j = \sqrt{\sum_j \phi_j^2 K_j a_j (1-a_j)}\, U. \quad (12)$$

Introducing the mean and variance of the extremal regulated connection processes discussed above:

$$m_j = e_o^j a_j,\ v_j = (e_o^j)^2 a_j(1-a_j). \quad (13)$$

And allowing:

$$\theta_j = \frac{\phi_j}{e_o^j} \frac{1}{\sum_k (\phi_k/e_o^k) K_k m_k} \quad (1 \le j \le J). \quad (14)$$

Then, from equation (11), for $k=1,\ldots,J$, $$-\ln Pr\left[U \ge \frac{\theta_k C - 1}{\sqrt{\sum_j \theta_j^2 K_j v_j}}\right] \ge -\ln L_k. \quad (15)$$

From standard bounds on the tail behavior of the Gaussian distribution, equation (15) yields:

$$\frac{\theta_k C - 1}{\sqrt{\sum_j \theta_j^2 K_j v_j}} \ge \delta_k \quad (1 \le k \le J). \quad (16)$$

Here $$\delta_K = \sqrt{2}\, Erfc^{-1}(2L_k) \approx \sqrt{-2\ln L_k - \ln 2\pi}$$

is a close, conservative approximation which is also asymptotically exact as the loss probability approaches zero, $L_k \to 0$.

Equation (16) can be solved by the following procedure to yield the result shown in equation (17) below. Starting with equation (16), and introducing the traffic mix $\eta$ from equation (6) above to solve for $k=1, 2, \ldots, J$, $$K \le \frac{\theta_k C - 1}{\delta_k^2 \sqrt{\sum_j \theta_j^2 \eta_j v_j}} \quad (17)$$

The value of interest is $K^{max}$, the largest value of $K$ satisfying equation (17). Therefore, the equation is rewritten to solve for $K^{max}$:

$$K^{max} = \max_\theta \min_k \frac{\theta_k C - 1}{\delta_k^2 \sqrt{\sum_j \theta_j^2 \eta_j v_j}} \quad (18)$$

The following lemma is now applied:

Given $N$ real-valued, continuous and differentiable functions $\{f_k(x): k \in \{1, 2, \ldots, N\}\}$ on $x \in \mathfrak{R}^N$ satisfying:

$$\frac{\partial f_k}{\partial x_k} > 0,\ \frac{\partial f_k}{\partial x_l} < 0 \text{ for } l \ne k \quad (19)$$

the optimal solution to $$O = \max_x \min_k f_k(x) \quad (20)$$

satisfies $$f_k(x^*) = 0 \quad (21)$$

for all $k \in \{1, 2, \ldots, N\}$ where $x^*$ is the optimizing vector. Referring back to equation (18), it should be clear that the solution must satisfy $$\frac{\theta_k C - 1}{\delta_k^2} = \Delta^2 \quad (22)$$

where $\Delta$ is a constant, for the case where $k=1, 2, \ldots, J$. Utilizing equation (22):

$$K^{max} = \frac{\Delta^2}{\Sigma_j \theta_j^2 \eta_j v_j} = \frac{\Delta^2 C^2}{\Sigma_j (1 + \delta_j \Delta)^2 \eta_j v_j} \quad (23)$$

Therefore, upon introducing the traffic mix $\eta$ into equation (14) above, $$\theta_j = \frac{1}{K} \frac{\phi_j/e_o^k}{\Sigma_k (\phi_k/e_o^k) \eta_k m_k} \quad (24)$$

and further, $$\sum_j \theta_j \eta_j m_j = \frac{1}{K}. \quad (25)$$

Substituting from equations (22) and (25) above, $$K^{max} = \frac{C}{\Sigma_j(1+\delta_j\Delta)\eta_j m_j}. \quad (26)$$

From equations (23) and (26), $$K^{max} = \frac{\Delta^2 C^2}{\Sigma_j(1+\delta_j\Delta)^2 \eta_j v_j} = \frac{C}{\Sigma_j(1+\delta L_j\Delta)\eta_j m_j}. \quad (27)$$

This computation yields equation (29) below, while equation (28) below is obtained from equation (22). It is straightforward to show that the above cubic equation in $\Delta$ has a unique positive solution. Finally, equation (30) follows from equation (26).

Equation (16) above now yields:

$$\phi_k \propto \theta_k e_o^k = \frac{e_o^k}{C}(1+\delta_k\Delta), \quad (28)$$

where $\Delta$ is the unique positive solution of the following cubic equation:

$$\frac{\Delta^2 C^2}{\Sigma_j(1+\delta_j\Delta)^2 K_j v_j} = \frac{C}{\Sigma_j(1+\delta_j\Delta)K_j m_j}. \quad (29)$$

This result is an approximation based on the Gaussian approximation. Note that the parameter $\Delta$ depends on the connection populations $\{K_j\}$, thus making the weights similarly dependent, as shown in equation (28).

The realizable region $\mathfrak{R}$ of connection population vectors K is now given by:

$$\sum_j K_j a_j e_o^j (1+\delta_j\Delta) \leq C. \quad (30)$$

which may be contrasted with equation (9). Since $\Delta$ depends on $\{K_j\}$ in equation (29) above, the left hand side of equation (30) is nonlinear in $\{K_j\}$. Inevitably, the design of the weights and the implementation of connection admission control (CAC) can be complicated. Note, however, that the effect of the connection population is entirely encapsulated in the single parameter $\Delta$. Hence, the connection population may be periodically monitored, from which $\Delta$ may be calculated and the weights returned.

An alternative approach to calculating the realizable region utilizing a Chernoff approximation is discussed further below. Calculation of the realizable region by the Chernoff approximation requires a determination of the bounds for characterizing the realizable region. A basic bound that holds for any random variable with a well defined moment generating function is calculated as:

$$-\ln Pr[x \geq C] \geq Cs - F(s) \quad (31)$$

for all $s \geq 0$, where $F(s)$ is the log moment generating function of the random variable x, defined as:

$$F(s) = \ln \epsilon[e^{sx}] \quad (32)$$

with $\epsilon[\ ]$ denoting the expected value. In particular, the tightest value of this bound is obtained thus:

$$-\ln Pr[x \geq C] \geq \max_s Cs - F(s). \quad (33)$$

Equation (33) determines the Chernoff bound, which is also asymptotically tight when x is the sum of a large number of independent random variables, where the number, as a proportion of C, is bounded as $C\to\infty$. Defining $M_k = C/e_o^k$ and $\delta_k = \ln L_k$, the Chernoff bound is applied to the probabilities in equation (5), therefore:

$$-\ln Pr\left[\sum_j \phi_j \sum_{i=1}^{K_j} \xi_i^j \geq \phi_k M_k\right] \geq \quad (34)$$

$$M_k s_k \phi_k - \sum_j K_j F_j(s_k \phi_j) \geq \delta_k \quad (k=1,\ldots,J)$$

where $$F_j(u) = \ln[1 - a_j + a_j e^u] \quad (35)$$

is the log moment generating function of the binary activity indicators $\xi^j$. For a given direction $\eta$, as shown in equation (6), equation (34) can be rewritten as:

$$K \leq \frac{M_k s_k \phi_k - \delta_k}{\sum_j \eta_j F_j(s_k \phi_j)} \quad (k=1,\ldots,J) \quad (36)$$

for some $s_k \geq 0$, for every k. The realizable region is therefore maximized along the given direction vector $\eta$ by solving:

$$K^{max}(\eta) = \max_\phi \min_k \max_{s_k} \frac{M_k s_k \phi_k - \delta_k}{\sum_j \eta_j F_j(s_k \phi_j)} \quad (37)$$

Equation (37) therefore yields the values of the weights $\{\phi_k\}$ that yield the largest realizable region for the given traffic mix $\eta$. The boundary of the realizable region is then given by $K = \eta K^{max}(\eta)$ as $\eta$ is varied over the positive orthant.

Equation (37) is difficult to solve analytically, as well as numerically. The following calculations focus on approximate solutions which realize subsets of $\mathfrak{R}$ together with the GPS weights.

In equation (36), the selection all $s_k$ are set equal to the same value. Furthermore, note from equation (36) that there is no loss of generality in assuming that s=1, since a constant of proportionality applied to the weights $\{\phi_j\}$ does not affect the solution. This modifies equation (36) to:

$$K \leq \frac{M_k \phi_k - \delta_k}{\sum_j \eta_j F_j(\phi_j)} \quad (k=1,\ldots,J) \quad (38)$$

which leads to the reduced problem $$K^{max}(\eta) \geq \max_\phi \min_k K_k^{approx}(\phi, \eta) \quad (39)$$

where $$K_k^{approx}(\phi, \eta) = \frac{M_k \phi_k - \delta_k}{\Sigma_j \eta_j F_j(\phi_j)} \quad (40)$$

Applying the lemma of equation (19) again, it can be shown that for a given $\eta$, the maximizing weight vector in this reduced problem satisfies $$K_k^{approx}(\phi, \eta) = \Omega (k=1, \ldots, J) \quad (41)$$

for some class-independent global parameter $\Omega$. This result then implies, from equation (40), $$M_k \phi_k - \delta_k = \Delta (k=1, \ldots, J) \quad (42)$$

where $\Delta$ is yet another class independent parameter. Therefore, the solution is:

$$\phi_k = \frac{1}{M_k}(\delta_k + \Delta) \ (k = 1, \ldots, J) \quad (43)$$

with $\Delta$ given by $$\Delta = \arg\max_{D \geq 0} \frac{D}{\Sigma_j \eta_j F_j \left[\frac{1}{M_j}(\delta_j + D)\right]} \quad (44)$$

Equations (43) and (44) provide a relatively simple approximate solution to the problem stated in equation (37). The maximization in equation (3442), which is the key step in the approximation, is one-dimensional, with a unique solution that follows from convexity, and the computation of $\Delta$ is straightforward.

The performances of the approximate solutions obtained from equations (43) and (44) have been tested in several non-homogeneous examples. The results, which are shown in FIGS. 2, 3, 4 and 5 and discussed above, show that the realizable region thus obtained closely approximates the optimal in all the examples.

An iterative technique for solving equation (37) is disclosed based on the Chernoff approximation, which is a refinement to the solution given by equations (43) and (44). The key distinguishing feature to this refinement is that the parameters $\{s_k\}$ in equation (37) are not required to be identical. This result is demonstrated by defining quantities $G_k$ and $H_k$ below based on equations (36) and (37), for k=1, 2, ..., J.

$$G_k(\eta, \phi, s_k) \equiv \frac{M_k s_k \phi_k - \delta_k}{\sum_j \eta_j F_j(s_k \phi_j)} \quad (45)$$

$$H_k(\eta, \phi) \equiv \max_{s_k} \frac{M_k s_k \phi_k - \delta_k}{\sum_j \eta_j F_j(s_k \phi_j)}. \quad (46)$$

The following two properties of equations (45) and (46) are straightforward to prove. First, the functions $H_k$ are uniquely defined for any reasonable set of log moment generating functions $\{F_j\}$ and fixed positive values of all the parameters. In other words, there exists a unique $s_k^*$ that solves the maximization problem in equation (46). Second, for a fixed traffic mix $\eta$, the function $H_k$ is an increasing function of $\phi_k$ and a decreasing function of $\{\phi_j: j \neq k\}$. Invoking the lemma of equation (19) again, the optimal solution to equation (37) satisfies:

$$H_k(\eta, \phi^*) \equiv \frac{M_k s_k^* \phi_k^* - \delta_k}{\sum_j \eta_j F_j(s_k^* \phi_j^*)} = \Omega \quad (47)$$

for all classes k, with the superscript * while referring to the optimizing values as before. These properties of the optimal solution are exploited in the following iterative process 700 as illustrated in FIG. 7.

Figure 7:
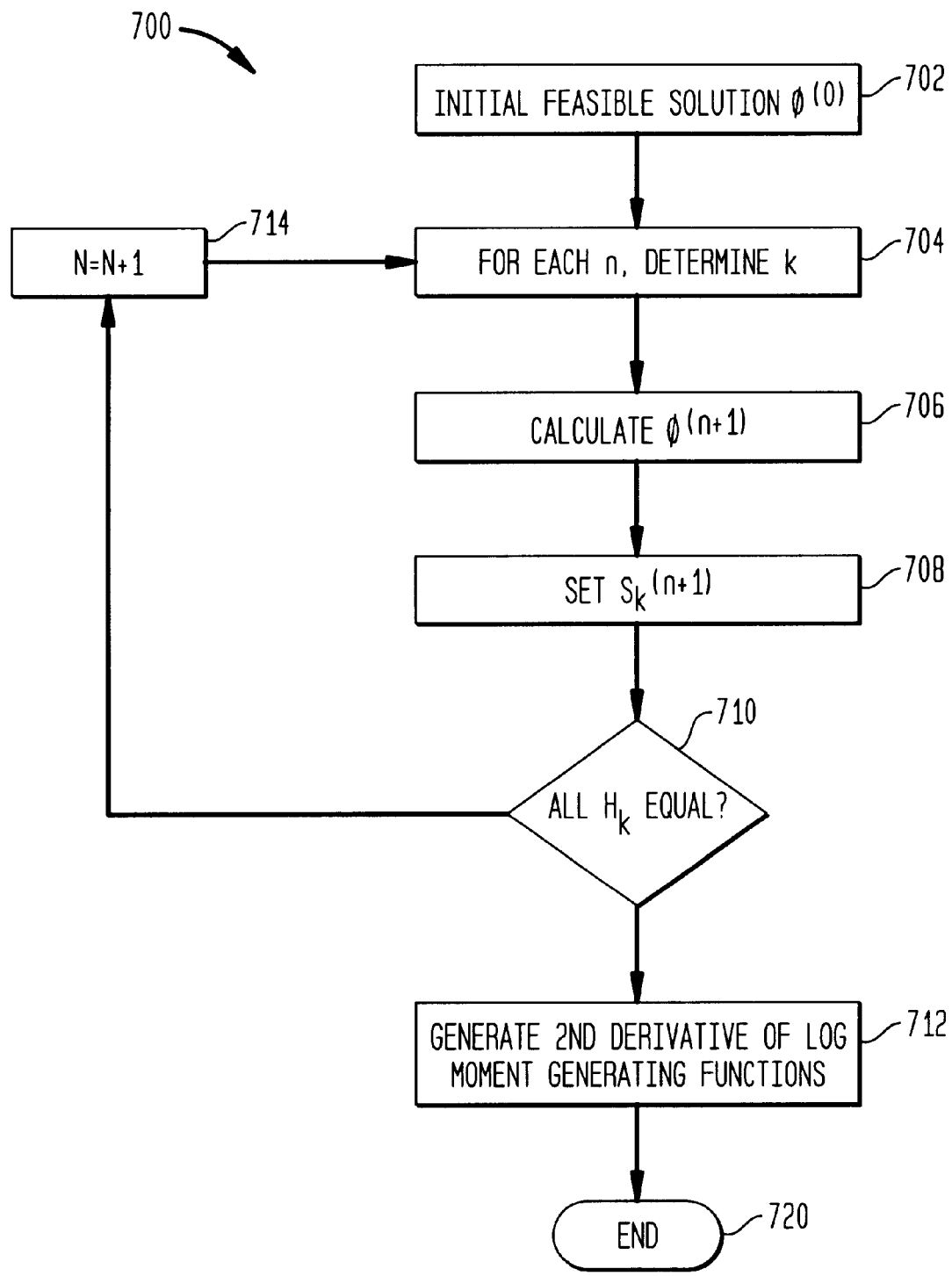
FIG. 7 illustrates a process for iteratively solving for the optimizing values of weights $\{\phi_K^*\}$ and connection class independent global parameters Ω and {$s_k^*$} in accordance with one embodiment of the present invention.

FIG. 7 illustrates an iterative process 700 to solve for the optimizing $\Omega$ in equation (47). Upon completion, process 700 yields $\Omega$, $\{\phi_k^*\}$, and $\{s_k^*\}$. Process 700 begins at step 702, where an initial feasible solution $\phi^{(0)}$, is obtained from equations (43) and (44), and $$s_k^{(0)} = \arg\max_s G_k(\eta, \phi^{(0)}, s). \quad (48)$$

At process step 704, for each step, labeled by n, determine $$k = \arg\max_j H_j(\eta, \phi^{(n)}) = \arg\max_j G_j(\eta, \phi^{(n)}, s_j^{(n)}). \quad (49)$$

At process step 706, update $\phi$ $$\phi^{n+1} = \phi^{(n)} - te_k \quad (50)$$

where $$t = \arg\max_{\tau \geq 0} \min_k G_k(\eta, \phi^{(n)} - \tau e_k, s_k) \quad (51)$$

and where $e_k$ is the unit vector with kth component set to 1. At process step 708, set $s_k$ $$s_k^{(n+1)} = \arg\max_s G_k(\eta, \phi^{(n+1)}, s). \quad (52)$$

At process step 710, determine if all $H_k$ are equal. If all $H_k$ are not equal, the process proceeds to step 714 where n is increased by 1. The process then proceeds to repeat steps 704 through 710 until all $H_k$ are equal. When all $H_k$ are equal, the process proceeds to step 712, the Chernoff bound is refined by generating the second derivative of the log moment generating functions, the process proceeds to step 720, and the process ends. The results from this implementation are shown in FIGS. 3A, 3B and 3C, and are described in detail above. Note that process 700 is guaranteed to converge, at a minimum, to a local optimum, since the objective always increases at every step. The word "local" is due to the fact that a uniqueness of the weights at the boundary of the realizable region has not been established, which would therefore guarantee a global optimum.

In another embodiment, the present invention further discloses advantageous methods and apparatus to perform adaptive weight control and adaptive connection admission control (CAC) in real time. In the discussion below, it is assumed that connections are not queued. In other words, connections are accepted or rejected immediately upon arrival. The CAC methods described depend heavily on the shape of the realizable region derived above, and can be applied to either of the two approximations described above. The following discussion addresses the Chernoff based approximate solution of the present invention. A very similar procedure may be readily applied for the Gaussian based approximation solution.

One embodiment of the present invention discloses a straightforward, greedy procedure that operates on the philosophy of avoiding weight changes unless necessary. In a typical real world implementation, it is desirable that the frequency of weight changes is small. In this case, "necessary" CAC should be interpreted to mean that without a weight change, the incoming connection cannot be accommodated.

In the following discussion, the realizable region is characterized by a single class independent global parameter $\Delta$ which also determines all the weights. Therefore, only parameter $\Delta$ need be adapted as opposed to the N-dimensional weight vector $\phi$, which is a convenient feature for implementation. Upon substituting equation (43) into equation (38), the following compact characterization of the approximate realizable region for fixed weights $\{\phi_j\}$ is obtained:

$$\sum_j K_j F_j(\phi_j) \leq \Delta \qquad (53)$$

Note that in the case of the Gaussian approximation, the corresponding characterization is given by solving equation (30).

Figure 10:
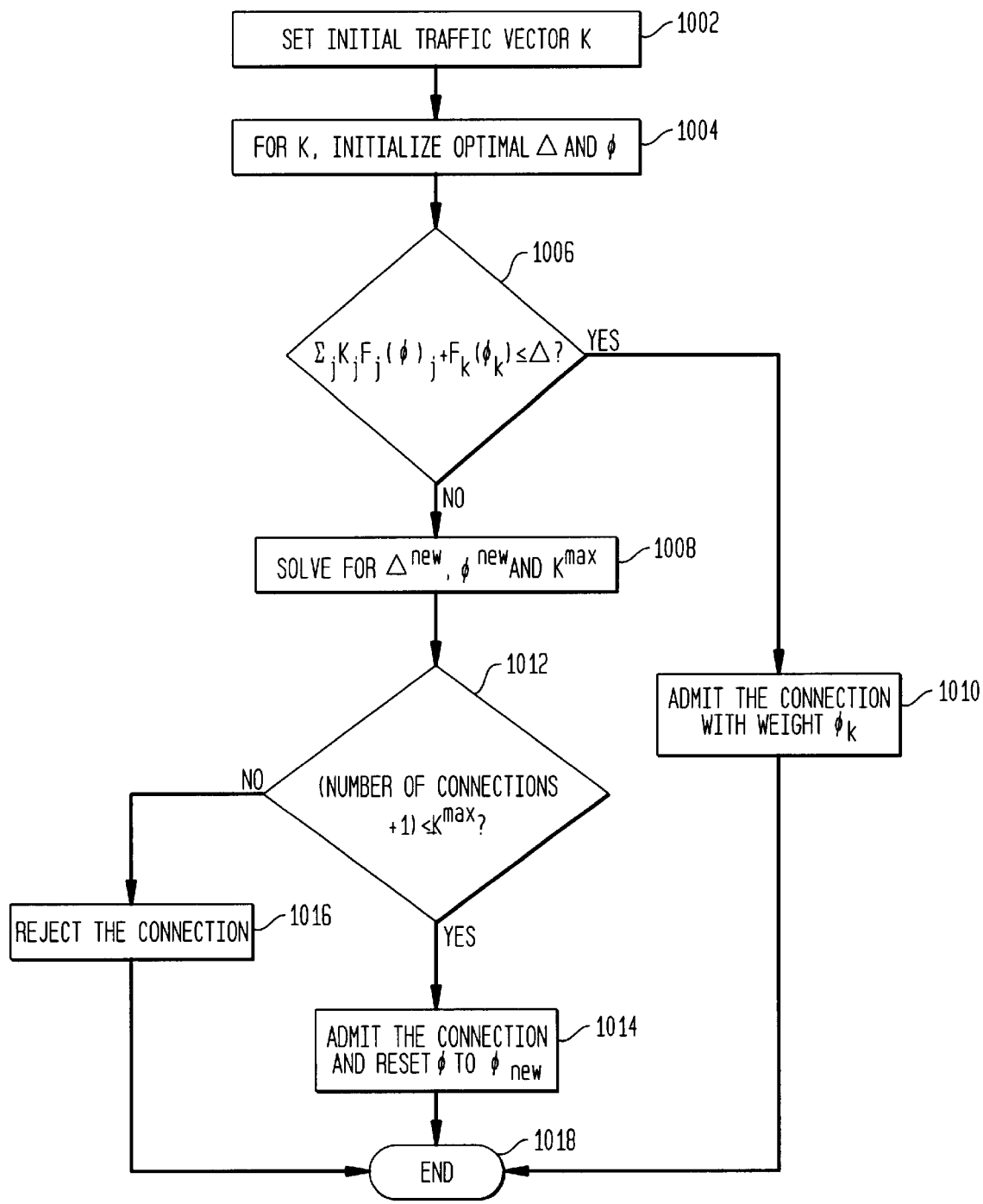
FIG. 10 illustrates a process for a necessity based connection admission control method in accordance with one embodiment of the present invention.

In another embodiment of the present invention, a "necessity-based" connection admission control (N-CAC) process 1000 is illustrated in FIG. 10 and discussed further below. The name N-CAC is used to denote that the weight changes are necessity based. The method of N-CAC illustrated by process 1000 is very economical in terms of the frequency of weight changes if the system operates within the realizable region. The number of weight changes may, however, increase rapidly as the system gets heavily loaded and the boundary of the realizable region is approached. In a practical implementation, further computational efficiency and reduction in weight changes may be obtained by imposing a threshold on changes in the direction of vector $\eta$ before recomputing weights. The method as disclosed by process 1000 below is "optimal" in the sense that it makes the minimum possible number of weight changes, while utilizing the entire realizable region during operation.

The process 1000 begins at step 1002, where an initial traffic vector K is set. At step 1004, an optimal $\Delta$ and $\phi$ are set. The process then proceeds to step 1004, where for each decision instant, such as the connection arrival of class k, the expression of the equation $\Sigma_j K_j F_j(\phi_j) + F_k(\phi_k) \leq \Delta$ is evaluated. If the expression is true, the process proceeds to step 1010 and the connection of class k is admitted with weight $\phi_k$. The process then proceeds to step 1018 and the process ends. If the expression:

$$\Sigma_j K_j F_j(\phi_j) + F_k(\phi_k) \leq \Delta$$

is not true, the process proceeds to step 1008 where the values $\Delta^{new}$ and $\phi^{new}$ are calculated utilizing equations (43) and (44). The value $K^{max}$ is also calculated utilizing equation (39). The process then proceeds to step 1012, where the expression:

$$\{\text{Number of admitted connections} +1\} \leq K^{max}$$

is evaluated. If the expression is true, the process proceeds to step 1014 and the connection is admitted, and $\phi$ is reset to $\phi^{new}$. The process then proceeds to step 1018, and the process ends. If the expression:

$$\{\text{Number of admitted connections} +1\} \leq K^{max}$$

is not true, then the connection is rejected, the process proceeds to step 1018 and the process ends.

The connection blocking performance of the N-CAC method is discussed below. The connection blocking performance of the method may be obtained from standard traffic models in which the state space is the realizable region. For Poisson traffic, with blocked connections cleared, the solution to this model is product form. In other words, the blocking probability $B_j$ for connections of class j is given by:

$$B_j = \frac{\sum_{K \in B_j} \Pi_m \frac{(\lambda_m / \mu_m)^{K_m}}{K_m!}}{\sum_{K \in S} \Pi_m \frac{(\lambda_m / \mu_m)^{K_m}}{K_m!}} \qquad (54)$$

where $\lambda_m$ is the offered Poisson rate for connections of class m, $1/\mu_m$ is the mean holding time of such connections, $B_j$ is the set of blocking states for connections of class j, and S denotes the realizable region. "Performance and Fluid Simulations of a Novel Shared Buffer Management System", Proceedings of IEEE INFOCOM'98, 1998, pp. 1449–1461.

Figure 11:
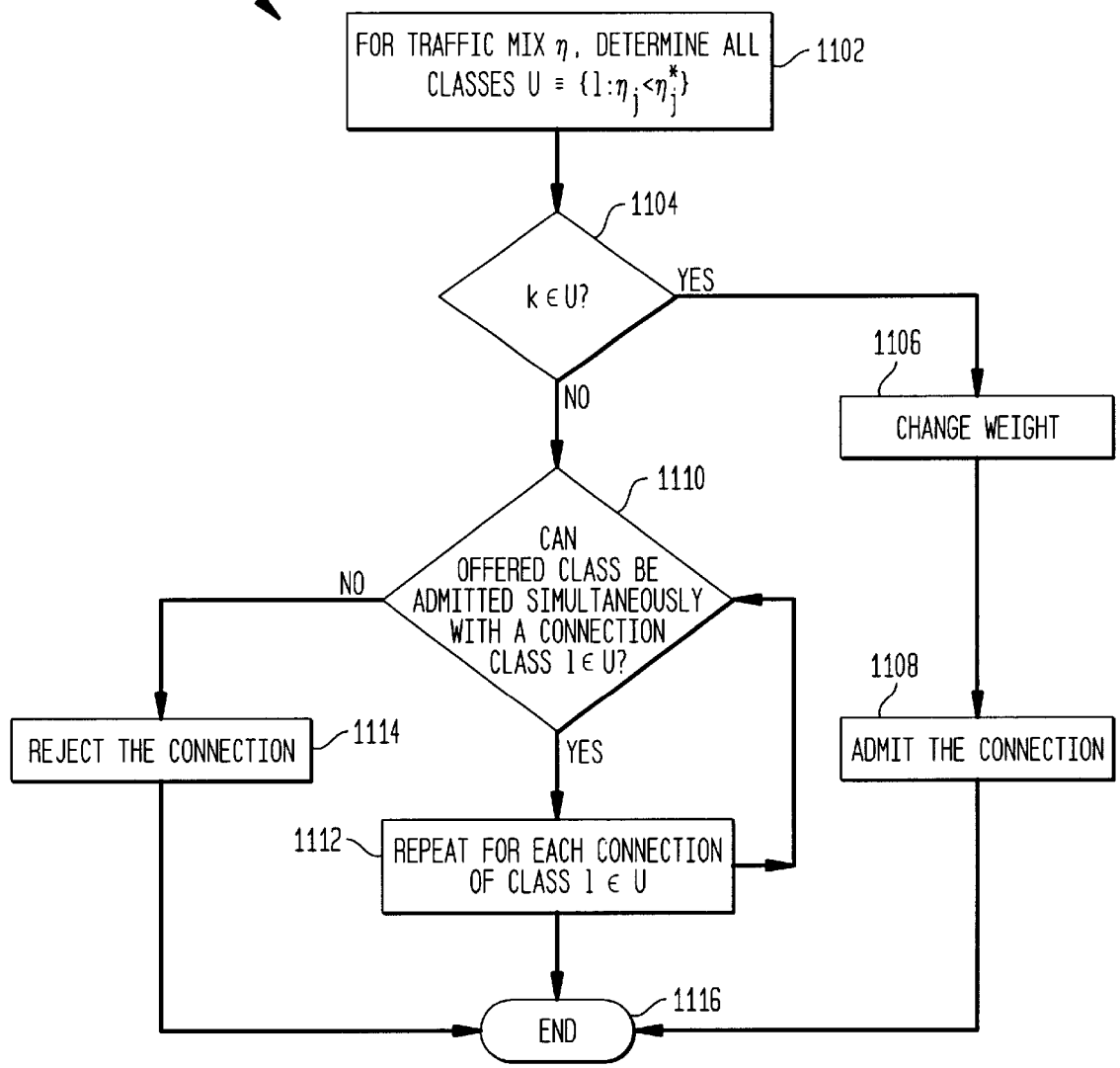
FIG. 11 illustrates a process for a virtual partitioning based connection admission control method in accordance with one embodiment of the present invention.

Relative to other VP based methods, the methods of the present invention utilize nominal allocations for each connection class, and reservations against classes that exceed their nominal allocations. The method then performs the following steps to admit an arriving connection of class k. The VP connection admission control (VP-CAC) process 1100 is illustrated in FIG. 11 and discussed further below.

The process 1100 begins at step 1102, where for the current traffic mix $\eta$ in the system, all classes $U \equiv \{l: \eta_j > \eta_j^*\}$, i.e., the set of "under loaded" classes, are determined. The process then proceeds to step 1104, where it is determined if the expression $k \in U$ is true for connection class k. If the expression is true, the process proceeds to step 1106. The connection weight is changed, if necessary, and the process proceeds to step 1108, where the connection is admitted. The process then proceeds to step 1116 and the process ends. If the expression $k \in U$ is not true, the process proceeds to step 1110. At step 1110, it is determined if the offered connection class can be admitted simultaneously with a connection of class $l \in U$, with a weight change if needed. If the connection cannot be admitted, the process proceeds to step 1114, where the connection is rejected. The process then proceeds to step 1116 and the process ends. If the offered class can be admitted at step 1110, the process proceeds to step 1112, and the process repeats for each connection of class $l \in U$. When all connections of class $l \in U$ have been admitted, the process proceeds to step 1116, and the process ends.

As stated above, the method reserves a capacity corresponding to that required to admit a single connection of any under loaded class in the system. Reservation for more than a single However, the N-CAC method has several drawbacks. First, as demonstrated later in the numerical results, the method is unfair towards connections requiring greater resources in terms of longer holding times or greater bandwidth. These connections are quickly squeezed out by the connections requiring less resources when the system is heavily loaded. Second, the weight changes are performed in a greedy manner, with no attention given to meeting class dependent blocking targets. Third, the method sometimes exhibits flapping, where the system reacts strongly to temporary traffic fluctuations, and does not settle into a steady state. The results of simulations utilizing the method of process 1000 are illustrated by FIGS. 8A, 8B and 8C, and are described above.

Therefore, a new method with superior performance, especially with regard to fairness, is disclosed. In this case, a "desirable" connection mix vector $\eta^*$ is assumed to be targeted when the system is heavily loaded. This vector may, for instance, be obtained by considerations of revenue maximization combined with considerations of fairness, such as meeting maximum blocking requirements for each class, for specified offered traffic. The method is effectively insensitive to $\eta^*$ when the system is lightly loaded, while gracefully enforcing the mix $\eta^*$ as the load becomes heavier. Such mechanisms have been proposed before in other contexts using the method of virtual partitioning (VP) described in other references and incorporated herein. See, for example, D. Mitra and I. Ziedins, "Virtual Partitioning by Dynamic Priorities: Fair and Efficient Resource Sharing by Several Services", Broadband Communications, Proceedings of the International Zurich Seminar on Digital Communications, 1976, pp. 173–185, S. Borst and D. Mitra, "Virtual Partitioning for Resource Sharing by State-Dependent Priorities: Analysis, Approximations and Performance for Heterogeneous Traffic", Teletraffic Contributions for the Information Age, Proc. ITC-15, 1997, pp. 1457–1468, and K. Kumaran and D. Mitra, such call, for purposes of increased protection, may also be considered. However, as discussed below, this is typically not necessary since reservation for a single connection enforces fairness effectively. As is to be expected, all the properties associated with robust and efficient resource sharing described in previous work on VP apply here. As intended, the method achieves the goal of unfettered sharing at light loads and drifts towards the intended traffic mix $\eta^*$ at heavy loads. The results of simulations utilizing the method of process 1100 are illustrated by FIGS. 9A, 9B and 9C, and are described above.

While the present invention is disclosed in the context of a presently preferred embodiment, it will be recognized that a wide variety of implementations may be employed by persons or ordinary skill in the art consistent with the above discussion and the claims that follow below.

We claim:

1. A generalized processor sharing (GPS) scheduler for allocating output bandwidth of said scheduler for a plurality of input connections comprising three or more classes of connections, each class of connections belonging to an associated quality of service class, there being one quality of service class for each class of connections, wherein each class of connections represents a different data type, comprising:

buffers for buffering each input connection;

memory for storing an initial predetermined connection weight for each input connection;

means for allocating a fraction of said output bandwidth to each input connection of each class of connections based on the initial connection weight stored for each input connection;

means for measuring the fraction of said output bandwidth used by each class of connections; and means for adjusting the initial connection weight for each input connection to the extent possible consistent with maintaining a minimum quality of service (QoS) level for the quality of service class with which each class of connections is associated.

2. The GPS scheduler of claim 1 wherein each class of connections has a different required minimum quality of service (QoS).

3. The GPS scheduler of claim 2 wherein each class of connections comprises one or more input connections.

4. The GPS scheduler of claim 3 wherein the initial connection weights are adjusted to maximize a realizable region of operation, the realizable region of operation being determined by an application of the central limit theorem.

5. The GPS scheduler of claim 4 wherein the buffers provide dual leaky bucket regulation of the input connections of each class of connections.

6. A generalized processor sharing (GPS) scheduler for allocating output bandwidth for an arbitrary number of input classes of connections, each class of connections belonging to an associated quality of service class, there being one quality of service class for each class of connections, wherein each class of connections represents a different data type, comprising:

buffers for buffering the input connections;

memory for storing an initial predetermined connection weight for each input connection;

means for allocating a fraction of said output bandwidth to each input connection of each class of connections based on the initial connection weight stored for each input connection;

means for measuring the fraction of said output bandwidth used by each class of connections; and means for adjusting the initial connection weight for each input connection while maintaining a predetermined minimum quality of service (QoS) level for the quality of service class with which each class of connections is associated.

7. The GPS scheduler of claim 6 wherein each class of connections has a different required minimum quality of service (QoS).

8. The GPS scheduler of claim 7 wherein each class of connections comprises one or more input connections.

9. The GPS scheduler of claim 8 wherein the means for adjusting the initial connection weights adjusts the weights to substantially maximize the realizable region of operation, based upon an adapted central limit approximation.

10. The GPS scheduler of claim 9 wherein the buffers provide dual leaky bucket regulation of the input connections.

11. A generalized processor sharing (GPS) scheduler for allocating output bandwidth of said scheduler for a plurality of input connections comprising three or more classes of connections, each class of connections belonging to an associated quality of service class, there being one quality of service class for each class of connections, wherein each class of connections represents a different data type, comprising:

a plurality of buffers for buffering the input connections;

memory for storing an initial predetermined connection weight for each input connection;

means for allocating a fraction of said output bandwidth to each input connection of each class of connections based on the initial connection weight stored for each input connection;

means for measuring the fraction of said output bandwidth used by each class of connections; and means for automatically adjusting the initial connection weight for each input connection to maintain a minimum quality of service (QoS) level for the quality of service class with which each class of connections is associated.

12. The GPS scheduler of claim 11 wherein each class of connections has a different required minimum quality of service (QoS).

13. The GPS scheduler of claim 12 wherein each class of connections comprises one or more input connections.

14. The GPS scheduler of claim 13 wherein the means for automatically adjusting the initial connection weights adjusts a realizable region of operation, the realizable region of operation being determined by an adapted central limit approximation.

15. The GPS scheduler of claim 14 wherein the buffers provide dual leaky bucket regulation of the input connections of each class of connections.

16. A method for generalized processor sharing (GPS) scheduling and network control, wherein j (j=1, 2, 3) classes of connections, each class of connections belonging to an associated quality of service class, there being one quality of service class for each class of connections, are presented to a GPS scheduler at a node with a total link bandwidth C, each class j comprising $K_j$ connections, and characterized by a quality of service (QOS) loss probability $L_j$, and a lossless multiplexing bandwidth $e_0^j$ and an activity factor $a_j$, each connection having an associated buffer and an allocated weight $\phi_j$ that determines said share of bandwidth C allocated to said connection, the method comprising the steps of:
  computing the number of connections $K_1$ in a first class of connections, and the weight $\phi_1$ associated with each connection in the first class of connections, the weight $\phi_1$ being the weight needed to achieve the quality of service associated with the quality of service class to which the first class of connections belongs;
  computing the number of connections $K_2$ in a second class of connections, and the weight $\phi_2$ associated with each connection in the second class of connections, the weight $\phi_2$ being the weight needed to achieve the quality of service associated with the quality of service class to which the second class of connections belongs;
  computing the number of connections $K_3$ in a third class of connections, and the weight $\phi_3$ associated with each connection in the third class of connections, the weight $\phi_3$ being the weight needed to achieve the quality of service associated with the quality of service class to which the third class of connections belongs.

17. The method of claim 16, further comprising the step of calculating said connection weights $\phi_j$, such that the following expressions are satisfied: for all k ($1 \leq k \leq J$), $$-\ln Pr\left[\sum_{j=1}^{J}\phi_j\sum_{i=1}^{K_j}\xi_i^j \geq \phi_k C/e_o^k\right] \geq -\ln L_k Pr(\xi_i^j = 1) = 1 - Pr(\xi_i^j = 0) = a_j$$

wherein $\xi_i^{(j)}$ are independent binary random variables that represent the activity indicator for the $i^{th}$ connection of class j that takes the value 1 if the connection is active, and 0 otherwise, and $a_j$ is the fraction of time that the corresponding buffer and bandwidth is utilized for the $i^{th}$ connection of class j.

18. The method of claim 17 wherein three or more input classes j of connections, where j (j=1, 2, . . . , n), are presented to a GPS scheduler at said node, further comprising the step of computing the number of connections $K_n$ in an $n^{th}$ class of connections, and the weight $\phi_n$ associated with each connection in the $n^{th}$ class of connections.

19. A method for GPS scheduling and network control utilizing the central limit theorem, wherein N classes of connections are presented to a GPS scheduler at a node with a total link bandwidth C, each class j comprising $K_j$ connections, each class of connections belonging to an associated quality of service class characterized by a quality of service (QoS) loss probability $L_j$, a lossless multiplexing bandwidth $e_0^j$ and an activity factor $a_j$, each connection having an associated buffer and allocated weight $\phi_j$ that determines the share of bandwidth allocated to the connection class, the method comprising the steps of:
  computing the weight assignments $\phi_j$ needed to achieve the quality of service associated with the quality of service class to which for each class belongs and supportable population vectors K, such that the following expression is satisfied;

$$K = K(\eta_1, \eta_2, ..., \eta_j), \sum_j \eta_j = 1,$$

where the vector $\eta$ denotes the traffic mix and each value of K is the largest value of K possible for a given $\eta$;
  computing the sum of the activity indicators $a_j$ for each class k as normally distributed, such that the following expression is satisfied, $$\sum_{i=1}^{K_j} \xi_i^j \rightarrow K_j a_j + \sqrt{K_j a_j(1-a_j)}\, U_j$$

where $U_j$ is normally distributed with mean of 0 and variance of 1;
  computing the mean $m_j$ and the variance $v_j$ of the bandwidth usage for each connection class j, and the weight $\phi_j$ of said connection class, such that the following expressions are satisfied:

$$m_j = e_j^0 a_j,$$
$$a_j = (e_j^0)^2 a_j(1-a_j),$$
$$\delta_K = \sqrt{2}\, Erfc^{-1}(2L_k) \approx \sqrt{-2\ln L_k - \ln 2\pi},$$
$$\frac{\theta_k C - 1}{\sqrt{\sum_j \theta_j^2 K_j v_j}} \geq \delta_k (1 \leq k \leq J).,$$
$$\theta_j = \frac{\phi_j}{e_o^j}\frac{1}{\sum_k (\phi_k/e_o^k)K_k m_k}(1 \leq j \leq J),$$
$$\phi_k \propto \theta_k e_o^k = \frac{e_o^k}{C}(1+\delta_k \Delta),$$
$$\frac{\Delta^2 C^2}{\sum_j (1+\delta_j\Delta)^2 K_j v_j} = \frac{C}{\sum_j (1+\delta_j\Delta)^2 K_j m_j},$$

where the connection class independent global parameter $\Delta$ is the unique positive solution of the cubic expression; and
  allocating bandwidth to each class of connections according to the weights $\phi_j$.

20. The method of claim 19, further comprising the step of computing the realizable region $\mathcal{R}$ of connection population vectors K that satisfy the expression:

$$\sum_j K_j a_j e_o^j (1+\delta_j \Delta) \leq C.$$

21. A generalized processor sharing (GPS) scheduler for allocating output bandwidth of said scheduler for a plurality of input connections comprising three or more classes of connections, each class of connections belonging to an associated quality of service class, there being one quality of service class for each class of connections, wherein each class of connections represents a different data type, comprising:
- buffers for buffering each input connection;
- memory for storing an initial predetermined connection weight for each input connection;
- means for allocating a fraction of said output bandwidth to each input connection of each class of connections based on the initial connection weight stored for each input connection;
- means for measuring the fraction of said output bandwidth used by each class of connections; and
- means for adjusting the initial connection weight for each input connection to the extent possible consistent with maintaining a minimum quality of service (QoS) level for the quality of service class with which each class of connections is associated.

22. The GPS scheduler of claim 21 wherein each class of connections has a different required minimum quality of service (QoS).

23. The GPS scheduler of claim 22 wherein each class of connections comprises one or more input connections.

24. The GPS scheduler of claim 23 wherein the initial connection weights are adjusted to maximize a realizable region of operation, the realizable region of operation being determined by an approximation utilizing a Chernoff approximation.

25. The GPS scheduler of claim 24 wherein the buffers provide dual leaky bucket regulation of the input connections of each class of connections.

26. A generalized processor sharing (GPS) scheduler for allocating output bandwidth for an arbitrary number of input classes of connections, each class of connections belonging to an associated quality of service class, there being one quality of service class for each class of connections, wherein each class of connections represents a different data type, comprising:
- buffers for buffering the input connections;
- memory for storing an initial predetermined connection weight for each input connection;
- means for allocating a fraction of said output bandwidth to each input connection of each class of connections based on the initial connection weight stored for each input connection;
- means for measuring the fraction of said output bandwidth used by each class of connections; and
- means for adjusting the initial connection weight for each input connection while maintaining a predetermined minimum quality of service (QoS) level for the quality of service class with which each class of connections is associated.

27. The GPS scheduler of claim 26 wherein each class of connections has a different required minimum quality of service (QoS).

28. The GPS scheduler of claim 27 wherein each class of connections comprises two or more input connections.

29. The GPS scheduler of claim 28 wherein the means for adjusting the initial connection weights adjusts the weights to substantially maximize the realizable region of operation, based upon an adapted Chernoff approximation.

30. The GPS scheduler of claim 29 wherein the buffers provide dual leaky bucket regulation of the input connections.

31. A generalized processor sharing (GPS) scheduler for allocating output bandwidth of said scheduler for a plurality of input connections comprising three or more classes of connections, each class of connections belonging to an associated quality of service class, there being one quality of service class for each class of connections, wherein each class of connections represents a different data type, comprising:
- a plurality of buffers for buffering the input connections;
- memory for storing an initial predetermined connection weight for each input connection;
- means for allocating a fraction of said output bandwidth to each input connection of each class of connections based on the initial connection weight stored for each input connection;
- means for measuring the fraction of said output bandwidth used by each class of connections; and
- means for iteratively and automatically adjusting the initial connection weight for each input connection to maintain a minimum quality of service (QoS) level for the quality of service class with which each class of connections is associated.

32. The GPS scheduler of claim 31 wherein each class of connections has a different required minimum quality of service (QoS).

33. The GPS scheduler of claim 32 wherein each class of connections comprises one or more input connections.

34. The GPS scheduler of claim 33 wherein the means for iteratively and automatically adjusting the initial connection weights adjusts a realizable region of operation, the realizable region of operation being determined by an adapted Chernoff approximation.

35. The GPS scheduler of claim 34 wherein the buffers provide dual leaky bucket regulation of the input connections of each class of connections.

36. A method for generalized processor sharing (GPS) scheduling and network control, wherein j (j=1, 2, 3) classes of connections are presented to a GPS scheduler at a node with a total link bandwidth C, each class j comprising $K_j$ connections, each class of connections belonging to an associated quality of service class, there being one quality of service class for each class of connections, each quality of service class being characterized by a quality of service (QoS) loss probability $L_j$, and a lossless multiplexing bandwidth $e_{0j}$ and an activity factor $a_j$, each connection having an associated buffer and an allocated weight $\phi_j$ that determines said share of bandwidth C allocated to said connection, the method comprising the steps of:
- computing the number of connections $K_1$ in a first class of connections, and the weight $\phi_1$ associated with each connection in the first class of connections, the weight $\phi_1$ being the weight needed to achieve the quality of service associated with the quality of service class to which the first class of connections belongs;
- computing the number of connections $K_2$ in a second class of connections, and the weight $\phi_2$ associated with each connection in the second class of connections, the weight $\phi_2$ being the weight needed to achieve the quality of service associated with the quality of service class to which the second class of connections belongs; and
- computing the number of connections $K_3$ in a third class of connections, and the weight $\phi_3$ associated with each connection in the third class of connections, the weight $\phi_3$ being the weight needed to achieve the quality of service associated with the quality of service class to which the first class of connections belongs.

37. The method of claim 36, further comprising the step of calculating said connection weights $\phi_j$, such that the following expressions are satisfied: for all k ($1 \leq k \leq J$), $$-\ln Pr\left[\sum_{j=1}^{J} \phi_j \sum_{i=1}^{K_j} \xi_i^j \geq \phi_k C / e_o^k\right] \geq -\ln L_k Pr(\xi_i^j = 1) = 1 - Pr(\xi_i^j = 0) = a_j$$

wherein $\xi_i^{(j)}$ are independent binary random variables that represent the activity indicator for the $i^{th}$ connection of class j that takes the value 1 if the connection is active, and 0 otherwise, and $a_j$ is the fraction of time that the corresponding buffer and bandwidth is utilized for the $i^{th}$ connection of class j.

38. The method of claim 37 wherein three or more input classes j of connections, where j (j=1, 2, . . . , n), are presented to a GPS scheduler at said node, further comprising the step of computing the number of connections $K_n$ in an $n^{th}$ class of connections, and the weight $\phi_n$ associated with each connection in the $n^{th}$ class of connections.

39. A method for GPS scheduling and network control utilizing the central limit theorem, wherein N classes of connections are presented to a GPS scheduler at a node with a total link bandwidth C, each class j comprising $K_j$ connections, each class j having an associated quality of service class, there being one quality of service class for each class j, each quality of service class being characterized by a quality of service (QoS) loss probability $L_j$, a lossless multiplexing bandwidth $e^j_0$ and an activity factor $a_j$, each connection having an associated buffer and allocated weight $\phi_j$ that determines the share of bandwidth allocated to the connection, the method comprising the steps of:

computing the weight assignments $\phi_j$ for each class and supportable population vectors K, such that the following expression is satisfied:

$$K = K(\eta_1, \eta_2, \ldots, \eta_j) \sum_j \eta_j = 1,$$

where the vector $\eta$ denotes the traffic mix and each value of K is the largest value of K possible for a given $\eta$;

computing a sum of the activity indicators $a_j$ for each class k as normally distributed, such that the following expression is satisfied:

$$\sum_{i=1}^{K_j} \xi_i^j \to K_j a_j + \sqrt{K_j a_j (1 - a_j)} \, U_j$$

where $U_j$ is normally distributed with mean of 0 and variance of 1;

computing the mean $m_j$ and the variance $v_j$ of the bandwidth usage for each connection class j, and the weight $\phi_j$ of said connection class, such that the following expressions are satisfied:

$m_j = e_j^0 a_j,$ $a_j = (e_j^0)^2 a_j (1 - a_j),$ $\delta_K = \sqrt{2} \, Erfc^{-1}(2L_k) \approx \sqrt{-2\ln L_k - \ln 2\pi},$ $$\theta_j = \frac{\phi_j}{e_o^j} \frac{1}{\sum_k (\phi_k / e_o^k) K_k m_k} (1 \leq j \leq J),$$

$$\phi_k \propto \theta_k e_o^k = \frac{e_o^k}{C}(1 + \delta_k \Delta), \text{ and}$$

$$\frac{\Delta^2 C^2}{\sum_j (1 + \delta_j \Delta)^2 K_j v_j} = \frac{C}{\sum_j (1 + \delta_j \Delta)^2 K_j m_j}$$

where the connection class independent global parameter $\Delta$ is the unique positive solution of the cubic expression; and allocating the available bandwidth among the classes according to the weight $\phi_j$ associated with each class.

40. The method of claim 39, further comprising the step of computing the realizable region $\Re$ of connection population vectors K that satisfy the expression:

$$\sum_j K_j a_j e_o^j (1 + \delta_j \Delta) \leq C.$$

41. An iterative method for determining a GPS weight $\phi_k$ in response to a change in the traffic mix of an arbitrary number of connection classes k as limit of the realizable region is reached and for determining a connection class to be admitted, the connection class to be admitted being the class having weight $\phi_k$, the method comprising the steps of:

setting an initial traffic vector K=($K_1, \ldots, K_k$), the values of ($K_1, \ldots K_k$) being arbitrarily chosen, for K connections of each of an arbitrary number of connection classes k, each connection class belonging to an associated quality of service class, there being one quality of service class for each class of connections;

setting an optimal weight $\phi_k$ and an optimal global parameter $\Delta$ characterizing the realizable region;

for each decision as to whether to admit a connection, evaluating the expression $$\sum_j K_j F_j(\phi_j) F_k(\phi_k) \leq \Delta$$

where $F_j(\phi_j)$ is a log moment generating function;

if the expression is true, admitting the connection;

if the expression is not true, calculating new values for $\Delta$ and $\phi$ and the maximum allowable number of connections;

if the maximum number of allowable connections has not been reached, resetting the value of $\phi$ to the new value and admitting the connection; and if the maximum number of connections has been reached, rejecting the connection.

42. An iterative method for choosing GPS weights $\phi_k$ for an arbitrary number of classes of connections, each class of connections belonging to an associated quality of service class, there being one quality of service class for each class of connections, the method comprising the steps of:

(a) choosing an initial feasible weight $\phi^{(0)}$;

(b) setting a step counter n to a value of 1;

(c) computing a value for k, such that the following expression is satisfied:

$$k = \underset{j}{\mathrm{argmax}}\, H_j(\eta, \phi^{(n)}) = \underset{j}{\mathrm{argmax}}\, G_j(\eta, \phi^{(n)}, s_j^{(n)});$$

(d) computing a subsequent weight $\phi^{(n+1)}$ by subtracting the quantity $\tau e_k$ from the weight $\phi^{(n+1)}$;

(e) computing a subsequent variable $s_k$ such that the following expression is satisfied:

$$s_k^{(n+1)} = \underset{s}{\mathrm{argmax}}\, G_k(\eta, \phi^{(n+1)}, s);$$

(f) computing the value $$H_k(\eta, \phi) \equiv \underset{s_k}{\max}\, \frac{M_k s_k \phi_k - \delta_k}{\sum_j \eta_j F_j(s_k \phi_j)};$$

(g) if all $H_k$ are not equal, returning to step (c);

(h) if all $H_k$ are equal, proceeding to step (i); and (i) allocating bandwidth among connections according to the computed values for the weights $\phi_k$.

43. A processor sharing node adapted for use as a GPS scheduler and network controller, said processor sharing node comprising:

input connections from a network for three input classes of connections, each class of connections belonging to an associated quality of service class, there being one quality of service class for each class of connections;

an output connection for connecting to a network;

a memory utilized to store weights to be applied to each of said classes of connections to determine the fraction of output bandwidth to allocate to each class of connections;

a processor utilized to measure the fraction of output bandwidth utilized by each of the three classes of connections, said processor further utilized to apply statistical methods to the measured fraction of output bandwidth utilized by each of the three classes of connections and to adjust the weights applied to each of said classes of connections to provide a minimum quality of service (QoS) to the quality of service class with which each class of connections is associated.

* * * * *